United States Patent
Tsujimoto et al.

(10) Patent No.: US 8,371,111 B2
(45) Date of Patent: Feb. 12, 2013

(54) EXHAUST GAS PURIFICATION SYSTEM FOR INTERNAL COMBUSTION ENGINE

(75) Inventors: Kenichi Tsujimoto, Susono (JP); Mikio Inoue, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 436 days.

(21) Appl. No.: 12/666,463

(22) PCT Filed: Jun. 13, 2008

(86) PCT No.: PCT/JP2008/061292
§ 371 (c)(1),
(2), (4) Date: Dec. 23, 2009

(87) PCT Pub. No.: WO2009/004935
PCT Pub. Date: Jan. 8, 2009

(65) Prior Publication Data
US 2010/0192550 A1 Aug. 5, 2010

(30) Foreign Application Priority Data
Jul. 4, 2007 (JP) .................................. 2007-176659

(51) Int. Cl.
*F01N 3/00* (2006.01)
*F01N 3/10* (2006.01)
*F02B 47/08* (2006.01)

(52) U.S. Cl. ................. 60/295; 60/277; 60/286; 60/289; 60/303; 123/568.11

(58) Field of Classification Search .................... 60/274, 60/286, 287, 295, 310
See application file for complete search history.

(56) References Cited

U.S. PATENT DOCUMENTS

| 6,044,643 | A | * | 4/2000 | Ittner et al. ...................... 60/289 |
| 6,122,909 | A | | 9/2000 | Murphy et al. |
| 2005/0060992 | A1 | | 3/2005 | Kogo et al. |
| 2007/0151232 | A1 | * | 7/2007 | Dalla Betta et al. ............ 60/286 |
| 2008/0053075 | A1 | | 3/2008 | Ueda et al. |
| 2010/0043407 | A1 | * | 2/2010 | Geyer ............................ 60/287 |

FOREIGN PATENT DOCUMENTS

| JP | 8 158928 | 6/1996 |
| JP | 2000 87736 | 3/2000 |
| JP | 2003 293736 | 10/2003 |

(Continued)

*Primary Examiner* — Kenneth Bomberg
*Assistant Examiner* — Jason Sheppard
(74) *Attorney, Agent, or Firm* — Oblon, Spivak, McClelland, Maier & Neustadt, L.L.P.

(57) ABSTRACT

An object of the present invention is to prevent an excessive temperature rise of a precatalyst in the case where the precatalyst is provided in the exhaust passage upstream of an exhaust gas purification apparatus and has a heat capacity smaller than that of the exhaust gas purification apparatus, and reducing agent is added from a reducing agent addition valve toward an upstream end surface of the precatalyst. According to the present invention, the reducing agent addition valve is located in such a way that the reducing agent added through it reaches the precatalyst in a liquid state. In the case where the level of activity of the precatalyst is higher than a specific level at the time when the addition of reducing agent through the reducing agent addition valve is performed so as to supply the reducing agent to the precatalyst and the exhaust gas purification apparatus, the reducing agent is added more intensively than in the case where the level of activity of the precatalyst is not higher than the specific level.

8 Claims, 19 Drawing Sheets

FOREIGN PATENT DOCUMENTS

| | | |
|---|---|---|
| JP | 2005 98130 | 4/2005 |
| JP | 2005 127257 | 5/2005 |
| JP | 2005 163586 | 6/2005 |
| JP | 2006 70818 | 3/2006 |
| JP | 2006 214388 | 8/2006 |
| JP | 2006 275020 | 10/2006 |
| JP | 2006 307811 | 11/2006 |
| JP | 2006 316720 | 11/2006 |
| JP | 2007 32398 | 2/2007 |
| JP | 2007 51594 | 3/2007 |

* cited by examiner (A)

(B)

EXHAUST GAS PURIFICATION SYSTEM FOR INTERNAL COMBUSTION ENGINE

This application is the national phase application under 35 U.S.C. §371 of PCT international application No. PCT/JP2008/061292 filed on 13 Jun. 2008, which claims priority to Japanese patent application No. 2007-176659 filed on 4 Jul. 2007, the contents of which are incorporated herein by reference.

TECHNICAL FIELD

The present invention relates to an exhaust gas purification system for an internal combustion engine equipped with a precatalyst provided upstream of an exhaust gas purification apparatus in an exhaust passage of an internal combustion engine and having a heat capacity smaller than that of the exhaust gas purification apparatus.

BACKGROUND ART

In an exhaust gas purification system for an internal combustion engine, an exhaust gas purification apparatus such as an NOx storage reduction catalyst (which will be hereinafter referred to as an "NOx catalyst"), a particulate filter on which a catalyst is supported (which will be hereinafter referred to as a "filter"), and a combination of them is provided in some cases in the exhaust passage of an internal combustion engine. There are also cases where a precatalyst having an oxidizing ability is provided in the exhaust passage upstream of the exhaust gas purification apparatus, and a reducing agent addition valve is provided in the exhaust passage immediately upstream of the precatalyst.

In this case, when the temperature of the exhaust gas purification apparatus is to be raised or the air-fuel ratio of the ambient atmosphere around the exhaust gas purification apparatus is to be decreased in order to recover the function of the exhaust gas purification apparatus, a reducing agent is supplied to the precatalyst and the exhaust gas purification apparatus by adding the reducing agent through the reducing agent addition valve.

In cases where a catalyst having a heat capacity smaller than that of the exhaust gas purification apparatus is used as the precatalyst, adding the reducing agent for supply to the precatalyst enables a temperature rise of the precatalyst at an earlier time, for example, during the cold start of the internal combustion engine. In consequence, the temperature of the exhaust gas purification apparatus can be raised at an earlier time.

Japanese Patent Application Laid-Open No. 2007-032398 describes a technology in which a fuel addition valve and a combustion catalyst are provided in a branch passage that branches from an exhaust passage at a position upstream of the exhaust gas purification apparatus to lead to the exhaust gas purification apparatus. According to this Japanese Patent Application Laid-Open No. 2007-032398, an air pump and an ignition plug are further provided in the branch passage.

Japanese Patent Application Laid-Open No. 2005-127257 describes a technology in which a reforming catalyst that reforms supplied fuel is provided in an exhaust passage upstream of an NOx catalyst. According to the technology described in this Japanese Patent Application Laid-Open No. 2005-127257, the reforming catalyst is disposed at a central position of the exhaust passage so that a roundabout gas flow channel is formed around the outer circumference of the reforming catalyst.

Japanese Patent Application Laid-Open No. 2006-70818 describes a technology in which a fuel injector is provided in an exhaust passage, and fuel is injected from the fuel injector, at a time when the temperature of the exhaust gas is equal to or higher than a reference temperature and the operation state of the internal combustion engine is an accelerating state, thereby controlling the temperature of the exhaust gas.

Japanese Patent Application Laid-Open No. 2006-275020 discloses a technology in which to prevent an excessive temperature rise of an exhaust gas purification catalyst from occurring, nitrogen-enriched air is supplied to an exhaust passage upstream of the exhaust gas purification catalyst.

Japanese Patent Application Laid-Open No. 8-158928 discloses a technology pertaining to a method of calculating the exhaust gas temperature taking into account the heat of vaporization of condensed water. Japanese Patent Application Laid-Open No. 2005-163586 discloses a technology pertaining to a method of raising the temperature of an NOx catalyst using an HC adsorption catalyst.

DISCLOSURE OF THE INVENTION

In the case where a precatalyst is provided in an exhaust passage upstream of an exhaust gas purification apparatus, and a reducing agent addition valve is provided in the exhaust passage immediately upstream of the precatalyst, the reducing agent is added from the reducing agent addition valve toward the upstream end surface of the precatalyst. In such cases also, when the function of the exhaust gas purification apparatus is to be recovered, a required quantity of reducing agent is added to the exhaust gas purification apparatus through the reducing agent addition valve. In this regard, if the heat capacity of the precatalyst is smaller than the heat capacity of the exhaust gas purification apparatus and the level of activity of the precatalyst is very high, the oxidation of a large amount of reducing agent would be promoted abruptly, whereby an excessive temperature rise of the precatalyst may occur.

The present invention has been made in view of the above-described problem and has an object to provide a technology that enables to prevent an excessive temperature rise of the precatalyst even in cases where a precatalyst having a heat capacity smaller than that of an exhaust gas purification apparatus is provided in an exhaust passage upstream of the exhaust gas purification apparatus and reducing agent is added from a reducing agent addition valve toward the upstream end surface of the precatalyst.

According to the present invention, the reducing agent addition valve is located at such a position that reducing agent added therethrough reaches the precatalyst in a liquid state. In addition, in the case where the level of activity of the precatalyst is higher than a specific level when the addition of the reducing agent through the reducing agent addition valve is performed to supply the reducing agent to the precatalyst and the exhaust gas purification apparatus, the reducing agent is added more intensively than in the case where the level of activity of the precatalyst is not higher than the specific level.

More specifically, an exhaust gas purification system for an internal combustion engine according to a first invention is characterized by comprising:

an exhaust gas purification apparatus provided in an exhaust passage of an internal combustion engine and configured to include a catalyst;

a precatalyst provided in the exhaust passage upstream of said exhaust gas purification apparatus, having a heat capacity smaller than that of said exhaust gas purification apparatus, and having an oxidizing ability; and a reducing agent addition valve provided in the exhaust passage immediately upstream of said precatalyst to add a reducing agent in a liquid state toward an upstream end surface of said precatalyst when supplying the reducing agent to said precatalyst and said exhaust gas purification apparatus, wherein in the case where the level of activity of said precatalyst is higher than a specific level at the time when the addition of the reducing agent through said reducing agent addition valve is performed, the reducing agent is added more intensively, during at least a portion of the period over which the addition of the reducing agent is performed, than in the case where the level of activity of said precatalyst is equal to or lower than said specific level.

Here, the specific level has a value equal to or smaller than a threshold value that allows to make a conclusion that an excessive temperature rise of the precatalyst may occur due to abrupt promotion of the oxidation of the reducing agent in the precatalyst if the level of activity of the precatalyst is higher than the specific level and the reducing agent is supplied to the precatalyst in the same manner as in the case where the level of activity of the precatalyst is equal to or lower than the specific level. The specific level as such is determined in advance by, for example, experiments. The specific level may be changed in accordance with the operation state of the internal combustion engine.

As the reducing agent in a liquid state is supplied to the precatalyst, the precatalyst is cooled by the reducing agent, because the temperature of the reducing agent is lower than that of the precatalyst. The more intensively the reducing agent is supplied to the precatalyst, the more the cooling of the precatalyst by the reducing agent is promoted.

The reducing agent in a liquid state supplied to the precatalyst vaporizes in the precatalyst. A portion of the vaporized reducing agent is oxidized in the precatalyst. In this process, the precatalyst is cooled due to the heat of vaporization used in the vaporization of the reducing agent, and heated by the heat of oxidization generated in the oxidation of the vaporized reducing agent. In this case, the more intensively the reducing agent is supplied to the precatalyst, the more the heat of vaporization used in the vaporization of the reducing agent per unit time increases. On the other hand, the more intensively the reducing agent is supplied to the precatalyst, the more the quantity of oxygen supplied to the precatalyst decreases, and consequently the harder it is to promote the oxidation of the reducing agent.

In other words, the more intensively the reducing agent is supplied to the precatalyst, the smaller the quantity of heating of the precatalyst by the heat of oxidation generated in the oxidation of the reducing agent is, and the larger the quantity of cooling of the precatalyst by the liquid reducing agent and the quantity of cooling of the precatalyst due to the heat of vaporization used in the vaporization of the reducing agent are.

Therefore, according to the present invention, an excessive temperature rise of the precatalyst can be prevented from occurring even in the case where the addition of the reducing agent by the fuel addition valve is performed in a state in which the level of activity of the precatalyst is higher than the specific level.

An exhaust gas purification system for an internal combustion engine according to a second invention is characterized by comprising:

an exhaust gas purification apparatus provided in an exhaust passage of an internal combustion engine and configured to include a catalyst;

a precatalyst provided in the exhaust passage upstream of said exhaust gas purification apparatus, having a heat capacity smaller than that of said exhaust gas purification apparatus, and having an oxidizing ability; and a reducing agent addition valve provided in the exhaust passage immediately upstream of said precatalyst to add a reducing agent in a liquid state toward an upstream end surface of said precatalyst when supplying the reducing agent to said precatalyst and said exhaust gas purification apparatus, wherein in the case where the level of activity of said precatalyst is higher than a specific level at the time when the addition of the reducing agent through said reducing agent addition valve is performed, said reducing agent addition valve is controlled in such a way, during at least a portion of the period over which the addition of the reducing agent is performed, that the same quantity of reducing agent is added in a shorter time period than in the case where the level of activity of said precatalyst is equal to or lower than said specific level.

Here, the specific level is a value the same as the specific level in the first invention.

According to this invention, in the case where the level of activity of the precatalyst is higher than the specific level at the time when the addition of the reducing agent through the reducing agent addition valve is performed, the reducing agent can be added more intensively, during at least a portion of the period over which the addition of the reducing agent is performed, than in the case where the level of activity of the precatalyst is equal to or lower than the specific level. Therefore, an excessive temperature rise of the precatalyst can be prevented from occurring.

An exhaust gas purification system for an internal combustion engine according to a third invention is characterized by comprising:

an exhaust gas purification apparatus provided in an exhaust passage of an internal combustion engine and configured to include a catalyst;

a precatalyst provided in the exhaust passage upstream of said exhaust gas purification apparatus, having a heat capacity smaller than that of said exhaust gas purification apparatus, and having an oxidizing ability; and a reducing agent addition valve provided in the exhaust passage immediately upstream of said precatalyst to intermittently add a reducing agent in a liquid state toward an upstream end surface of said precatalyst when supplying the reducing agent to said precatalyst and said exhaust gas purification apparatus, wherein in the case where the level of activity of said precatalyst is higher than a specific level at the time when the intermittent addition of the reducing agent through said reducing agent addition valve is performed, said reducing agent addition valve is controlled in such a way, during at least a portion of the period over which the intermittent addition of the reducing agent is performed, that a quantity of reducing agent larger than a quantity of reducing agent added in one reducing agent addition period in the case where the level of activity of said precatalyst is equal to or lower than said specific level is added in a time period equal to the sum of one reducing agent addition period and one reducing agent addition suspension period subsequent thereto in the case where the level of activity of said precatalyst is equal to or lower than said specific level.

Here, the specific level is a value the same as the specific level in the first invention.

According to this invention, the addition of the reducing agent through the reducing agent addition valve is performed intermittently. In other words, when the reducing agent is supplied to the precatalyst and the exhaust gas purification apparatus, the reducing agent addition valve is controlled in such a way that reducing agent addition periods in which the addition of the reducing agent is performed and reducing agent addition suspension periods in which the addition of the reducing agent is suspended alternate with each other. Here, the sum of one reducing agent addition period and one reducing agent addition suspension period subsequent thereto will be referred to as the unit period. In addition, the quantity of the reducing agent added in one reducing agent addition period will be referred to as the unit added quantity.

According to this invention, in the case where the level of activity of the precatalyst is higher than the specific level, a quantity of reducing agent larger than the unit added quantity in the case where the level of activity of the precatalyst is equal to or lower than the specific level is added in a time period equal to the unit period in the case where the level of activity of the precatalyst is equal to or lower than the specific level, during at least a portion of the period over which the intermittent addition of the reducing agent is performed. Thus, in the case where the level of activity of the precatalyst is higher than the specific level, the quantity of reducing agent added in the same period becomes larger than that in the case where the level of activity of the precatalyst is equal to or lower than the specific level, during at least a portion of the period over which the intermittent addition of the reducing agent is performed.

Consequently, according to this invention, in the case where the level of activity of the precatalyst is higher than the specific level at the time when the addition of the reducing agent through the reducing agent addition valve is performed, the reducing agent can be added more intensively, during at least a portion of the period over which the addition of the reducing agent is performed, than in the case where the level of activity of the precatalyst is equal to or lower than the specific level. Therefore, an excessive temperature rise of the precatalyst can be prevented from occurring.

In this invention, in the case where the level of activity of the precatalyst is higher than the specific level at the time when the intermittent addition of the reducing agent through the reducing agent addition valve is performed, at least one of (1) a control that makes the reducing agent addition suspension period shorter than that in the case where the level of activity of the precatalyst is equal to or lower than the specific level, (2) a control that makes the reducing agent addition period longer than that in the case where the level of activity of the precatalyst is equal to or lower than the specific level, and (3) a control that makes the quantity of reducing agent added per unit time during the reducing agent addition period larger than that in the case where the level of activity of the precatalyst is equal to or lower than the specific level, may be executed during at least a portion of the period over which the intermittent addition of the reducing agent is performed.

By executing at least one of the aforementioned controls (1) to (3), a quantity of reducing agent larger than the unit added quantity in the case where the level of activity of the precatalyst is equal to or lower than the specific level can be added through the reducing agent addition valve in a time period equal to the unit period in the case where the level of activity of the precatalyst is equal to or lower than the specific level.

In the systems according to the first to third inventions, the precatalyst may be provided in such a way that not all but a portion of the exhaust gas flowing into the exhaust gas purification apparatus passes through the precatalyst.

In the case where the flow rate of the exhaust gas flowing into the precatalyst is small, heating of the precatalyst by the heat of oxidation generated by the oxidation of the reducing agent tends to be promoted more strongly than in the case where the flow rate of the exhaust gas flowing into the precatalyst is large. Therefore, in the case of the above-described configuration, if the reducing agent is added in the case where the level of activity of the precatalyst is higher than the specific level in the same way as in the case where the level of activity of the precatalyst is equal to or lower than the specific level, an excessive temperature rise of the precatalyst is likely to occur.

On the other hand, in the case of the above-described configuration, when the reducing agent is added toward the upstream end surface of the precatalyst, the quantity of the reducing agent supplied to the precatalyst per unit area is larger than that in configurations in which all of the exhaust gas flowing into the exhaust gas purification apparatus passes through the precatalyst. In consequence, when the reducing agent is added through the reducing agent addition valve more intensively, the precatalyst tends to be cooled more effectively. Therefore, the effect of preventing an excessive temperature rise of the precatalyst in the first to third inventions is enhanced.

In the systems according to the first to third inventions, in the case where the level of activity of the precatalyst is higher than the specific level at the time when the addition of the reducing agent through the reducing agent addition valve is performed, the flow rate of the exhaust gas flowing into the precatalyst may be increased.

As the flow rate of the exhaust gas flowing into the precatalyst is increased, the quantity of heat carried away by the exhaust gas increases. Therefore, the above feature provides a further contribution to the prevention of an excessive temperature rise of the precatalyst.

The systems according to the first to third inventions may further comprise an EGR apparatus that introduces a portion of the exhaust gas into an intake system of the internal combustion engine as EGR gas. In this case, there may be further provided EGR gas introduction unit for introducing the EGR gas into the precatalyst in the case where the level of activity of the precatalyst is higher than the specific level at the time when the addition of the reducing agent through the reducing agent addition valve is performed.

In the case where the EGR gas is introduced into the precatalyst, the flow rate of the gas (i.e. the exhaust gas plus EGR gas) passing through the precatalyst increases, like in the case where the flow rate of the exhaust gas is increased. In consequence, the quantity of heat carried away by the gas increases. Therefore, the above feature provides a further contribution to the prevention of an excessive temperature rise of the precatalyst.

The systems according to the first to third inventions may further comprise fresh air introduction unit for introducing intake air of the internal combustion engine or outside air into the precatalyst in the case where the level of activity of said precatalyst is higher than the specific level at the time when the addition of the reducing agent through the reducing agent addition valve is performed.

In the case where intake air of the internal combustion engine or outside air is introduced into the precatalyst, the flow rate of the gas (i.e. the exhaust gas plus intake air or outside air) passing through the precatalyst increases, like in the case where the flow rate of the exhaust gas is increased. In consequence, the quantity of heat carried away by the gas increases. Therefore, the above feature provides a further contribution to the prevention of an excessive temperature rise of the precatalyst. The temperature of the intake air of the internal combustion engine and outside air is lower than the exhaust gas. Therefore, with the above feature, an excessive temperature rise of the precatalyst can be prevented more effectively.

In the systems according to the first to third inventions, the reducing agent addition valve may add the reducing agent obliquely to the upstream end surface of the precatalyst.

In this case, the reducing agent is likely to strike on one surface of each partition wall of the precatalyst and unlikely to strike on the other surface of each partition wall of the precatalyst. Thus, the surface of the partition wall of the precatalyst on which the reducing agent is likely to strike tends to be cooled as the reducing agent is supplied. On the other hand, the oxidation of the reducing agent tends to be promoted on the surface of the partition wall of the precatalyst on which the reducing agent is unlikely to strike.

Therefore, with the above feature, in the case where the level of activity of the precatalyst is equal to or lower than the specific level, the oxidation of the reducing agent in the precatalyst can be promoted more strongly when the addition of the reducing agent through the reducing agent addition valve is performed. On the other hand, in the case where the level of activity of the precatalyst is higher than the specific level, the cooling of the precatalyst is more promoted, whereby an excessive temperature rise of the precatalyst can be prevented more effectively.

THE BEST MODE FOR CARRYING OUT THE INVENTION

In the following, specific embodiments of the exhaust gas purification system for an internal combustion engine according to the present invention will be described with reference to the drawings.

Embodiment 1

<General Configuration of Air-Intake and Exhaust System of Internal Combustion Engine>

Figure 1:
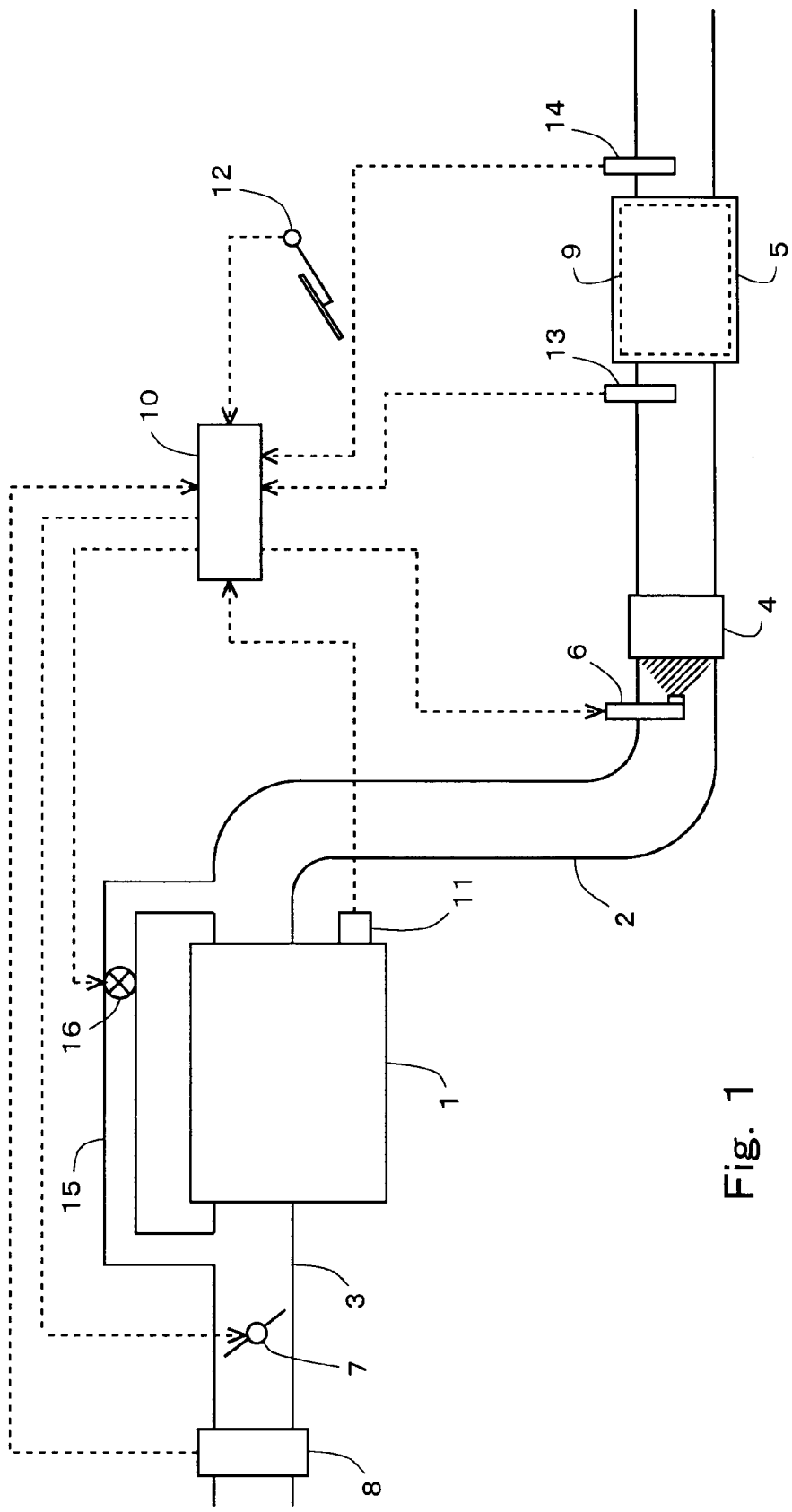
FIG. 1 is a diagram showing the general configuration of an air-intake and exhaust system of an internal combustion engine according to embodiment 1.

Here, a case in which the present invention is applied to a diesel engine for driving a vehicle will be described by way of example. FIG. 1 is a diagram showing the general configuration of the air-intake and exhaust system of an internal combustion engine according to this embodiment.

The internal combustion engine 1 is a diesel engine for driving a vehicle. The internal combustion engine 1 is connected with an intake passage 3 and an exhaust passage 2. A throttle valve 7 and an air flow meter 8 are provided in the intake passage 3.

A filter 5 that traps particulate matter (which will be referred to as PM hereinafter) in the exhaust gas is provided in the exhaust passage 2. An NOx catalyst 9 is supported on the filter 5. In this embodiment, the filter 5 and the NOx catalyst 9 correspond to the exhaust gas purification apparatus according to the present invention.

An oxidation catalyst 4 is provided in the exhaust passage 2 upstream of the filter 5. The heat capacity of the oxidation catalyst 4 is smaller than the heat capacity of the filter 5. In this embodiment, the oxidation catalyst 4 corresponds to the precatalyst according to the present invention. Any catalyst having an oxidizing ability may be used as the oxidation catalyst 4. For example, a three-way catalyst or NOx catalyst may be provided in place of the oxidation catalyst 4.

A fuel addition valve 6 that adds fuel as a reducing agent is provided in the exhaust passage 2 immediately upstream of the oxidation catalyst 4. The fuel addition valve 6 is provided with a fuel injection port opposed to the upstream end surface of the oxidation catalyst 4, and liquid fuel is injected from the fuel injection port toward the upstream end surface of the oxidation catalyst 4. The fuel is injected conically from the fuel injection port of the fuel addition valve 6 (the sprayed fuel being represented by the hatched portion in FIG. 1). Here, the expression "immediately upstream of the oxidation catalyst 4" implies that the fuel addition valve 6 is disposed at a position within such a range that at least a portion of the fuel injected from the fuel injection port of the fuel addition valve 6 reaches the oxidation catalyst 4 in a liquid state. In this embodiment, the fuel addition valve 6 corresponds to the reducing agent addition valve according to the present invention.

In this embodiment, an EGR passage 15 is provided to introduce a portion of the exhaust gas into the internal combustion engine 1 as the EGR gas. One end of the EGR passage 15 is connected to the exhaust passage 2 upstream of the fuel addition valve 6, and the other end thereof is connected to the intake passage 3 downstream of the throttle valve 7. An EGR valve 16 for regulating the flow rate of the EGR gas is provided in the EGR passage 15.

An air-fuel ratio sensor 13 that senses the air-fuel ratio of the exhaust gas is provided in the exhaust passage 2 between the oxidation catalyst 4 and the filter 5. A temperature sensor 14 that senses the temperature of the exhaust gas is provided in the exhaust passage 2 downstream of the filter 5.

An electronic control unit (ECU) 10 that controls the internal combustion engine 1 is annexed to the internal combustion engine 1 having the above-described configuration. The ECU 10 is electrically connected with the air flow meter 8, the air-fuel ratio sensor 13, the temperature sensor 14, a crank position sensor 11 and an accelerator opening degree sensor 12. Output signals of them are input to the ECU 10.

The crank position sensor 11 is a sensor that senses the crank angle of the internal combustion engine 1. The accelerator opening degree sensor 12 is a sensor that senses the accelerator opening degree of the vehicle on which the internal combustion engine 1 is mounted. The ECU 10 calculates the engine rotational speed of the internal combustion engine 1 based on the output value of the crank position sensor 11, and calculates the engine load of the internal combustion engine 1 based on the output value of the accelerator opening degree sensor 12. The ECU 10 estimates the air-fuel ratio of the ambient atmosphere around the filter 5 (or the ambient atmosphere around the NOx catalyst 9) based on the output value of the air-fuel ratio sensor 13, and estimates the temperature of the filter 5 (or the temperature of the NOx catalyst 9) based on the output value of the temperature sensor 14.

The ECU 10 is also electrically connected with the throttle valve 7, the fuel addition valve 6, the EGR valve 16, and the fuel injection valve(s) of the internal combustion engine 1. They are controlled by the ECU 10.

<Filter Regeneration Control>

In this embodiment, a filter regeneration control is performed to remove the PM trapped in the filter 5. The filter regeneration control according to this embodiment is implemented by adding fuel through the fuel addition valve 6 to thereby supply fuel to the oxidation catalyst 4 and the filter 5. As the fuel supplied to the oxidation catalyst 4 is oxidized in the oxidation catalyst 4, the temperature of the exhaust gas flowing into the filter 5 is raised by the heat of oxidation generated thereby. Consequently, the temperature of the filter 5 rises. In addition, the fuel having passed through the oxidation catalyst 4 without being oxidized therein is supplied to the filter 5. As the fuel supplied to the filter 5 is oxidized in the NOx catalyst 9, the temperature of the filter 5 further is further raised by the heat of oxidation generated thereby. The temperature of the filter 5 can be raised to a target temperature that enables the oxidation of the PM by controlling the quantity of fuel added through the fuel addition valve 6, whereby the PM trapped in the filter 5 can be removed by oxidizing it.

In the filter regeneration control according to this embodiment, the quantity of added fuel needed in the filter regeneration control (which will be hereinafter referred to as the required addition quantity) is determined based on the difference between the temperature of the filter 5 at the time of executing the filter regeneration control and the target temperature and the operation state of the internal combustion engine 1 etc. When the filter regeneration control is executed, the required addition quantity of fuel is added intermittently in multiple separate portions through the fuel addition valve 6.

<Fuel Addition Pattern>

In this embodiment, fuel is added from the fuel addition valve 6 toward the upstream end surface of the oxidation catalyst 4. Thus, the fuel added through the fuel addition valve 6 is supplied to the oxidation catalyst 4 without being diffused widely in the exhaust gas.

The temperature of the oxidation catalyst 4 changes with changes in the temperature of the exhaust gas. The higher the temperature of the oxidation catalyst 4 is, the higher the level of activity of the oxidation catalyst 4 is. As described before, in this embodiment, the heat capacity of the oxidation catalyst 4 is smaller than that of the filter 5. Therefore, when the level of activity of the oxidation catalyst 4 is unduly high at the time of execution of the filter regeneration control, adding the required addition quantity of fuel through the fuel addition valve 6 may lead to an excessive temperature rise of the oxidation catalyst 4 due to abruptly promoted oxidation of a large amount of fuel in the oxidation catalyst 4.

In view of this, in the filter regeneration control in this embodiment, in order to prevent an excessive temperature rise of the oxidation catalyst 4 from occurring, the fuel addition pattern in adding the fuel through the fuel addition valve 6 is changed in accordance with the level of activity of the oxidation catalyst 4 at the time of execution of the filter regeneration control. In the following, fuel addition patterns in executing the filter regeneration control according to this embodiment will be described with reference to FIGS. 2 and 3.

Figure 2:
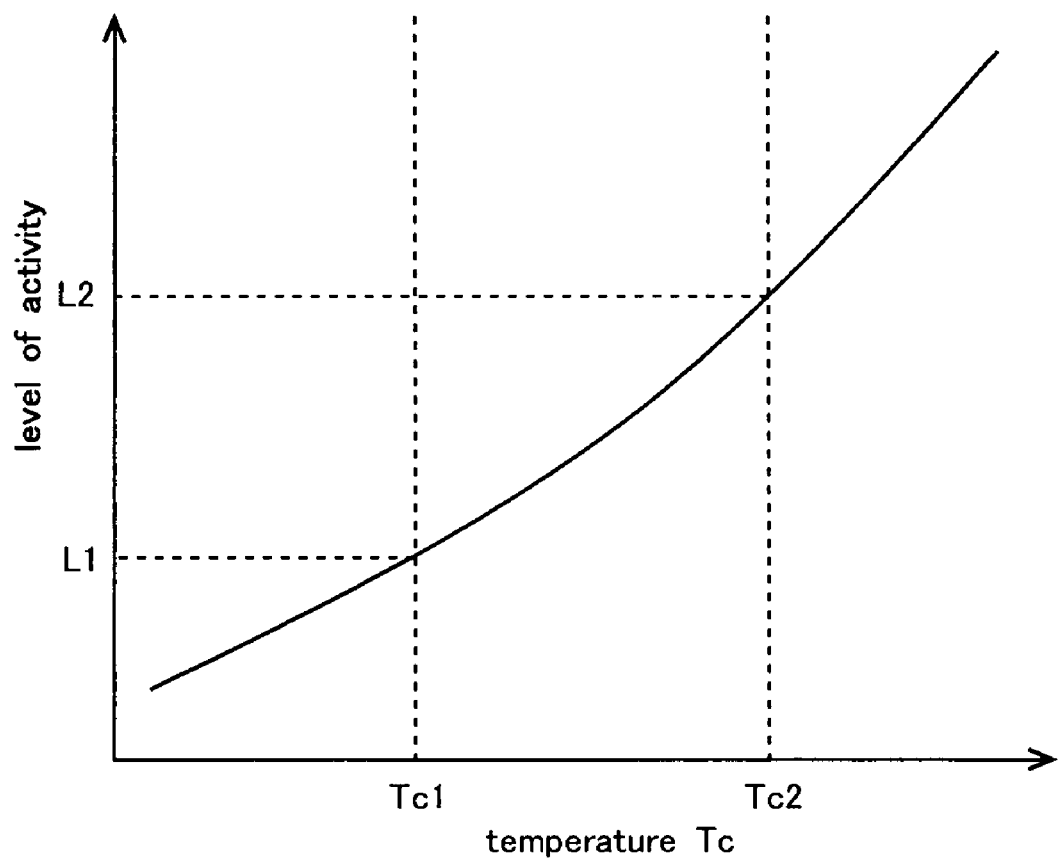
FIG. 2 is a graph showing a relationship between the temperature of an oxidation catalyst and the level of activity of the oxidation catalyst in embodiment 1.

FIG. 2 is a diagram showing the relationship between the temperature Tc of the oxidation catalyst 4 and the level of activity of the oxidation catalyst 4. In FIG. 2, the horizontal axis represents the temperature Tc of the oxidation catalyst 4, and the vertical axis represents the level of activity of the oxidation catalyst 4.

As described above, the higher the temperature Tc of the oxidation catalyst 4 is, the higher the level of activity of the oxidation catalyst 4 is. The optimum state of the activity of the oxidation catalyst 4 in this embodiment is achieved when the temperature Tc is in the range from Tc1 to Tc2. Here, the level of activity of the oxidation catalyst 4 at the time when the temperature Tc of the oxidation catalyst 4 is Tc1 will be referred to as level L1, and the level of activity of the oxidation catalyst 4 at the time when the temperature Tc of the oxidation catalyst 4 is Tc2 will be referred to as level L2.

The level L1 of the activity of the oxidation catalyst 4 is a threshold value beyond which it may be concluded that it may be difficult to raise the temperature of the oxidation catalyst 4 sufficiently due to insufficient promotion of the oxidation of fuel in the oxidation catalyst 4, if fuel is added through the fuel addition valve 6 during the execution of the filter regeneration control in the same manner as in the case where the level of activity of the oxidation catalyst 4 is equal to or higher than this level L1. Furthermore, the level L2 of the activity of the oxidation catalyst 4 is a threshold value beyond which it may be concluded that an excessive temperature rise of the oxidation catalyst 4 may occur due to abrupt promotion of the oxidation of fuel in the oxidation catalyst 4, if fuel is added through the fuel addition valve 6 during the execution of the filter regeneration control in the same manner as in the case where the level of activity of the oxidation catalyst 4 is equal to or lower than this level L2. In this embodiment, level L2 of activity of the oxidation catalyst 4 corresponds to the specific level according to the present invention.

Hereinafter, the range of the level of activity of the oxidation catalyst 4 equal to or higher than L1 and equal to or lower than L2 will be referred to as the optimum activity range. Furthermore, the range of the level of activity of the oxidation catalyst 4 lower than L1 will be referred to as the low activity range, and the range of the level of activity of the oxidation catalyst 4 higher than L2 will be referred to as the over-active range. The optimum activity range of the oxidation catalyst 4 can be determined in advance based on, for example, experiments. The levels L1 and L2 of the activity of the oxidation catalyst 4 set as above change depending on the operation state of the internal combustion engine 1. Specifically, the levels L1 and L2 of the activity of the oxidation catalyst 4 are lower during high load operations than during low load operations. Consequently, the optimum activity range, the low activity range, and the over-active range also change depending on the operation state of the internal combustion engine 1.

Figure 3:
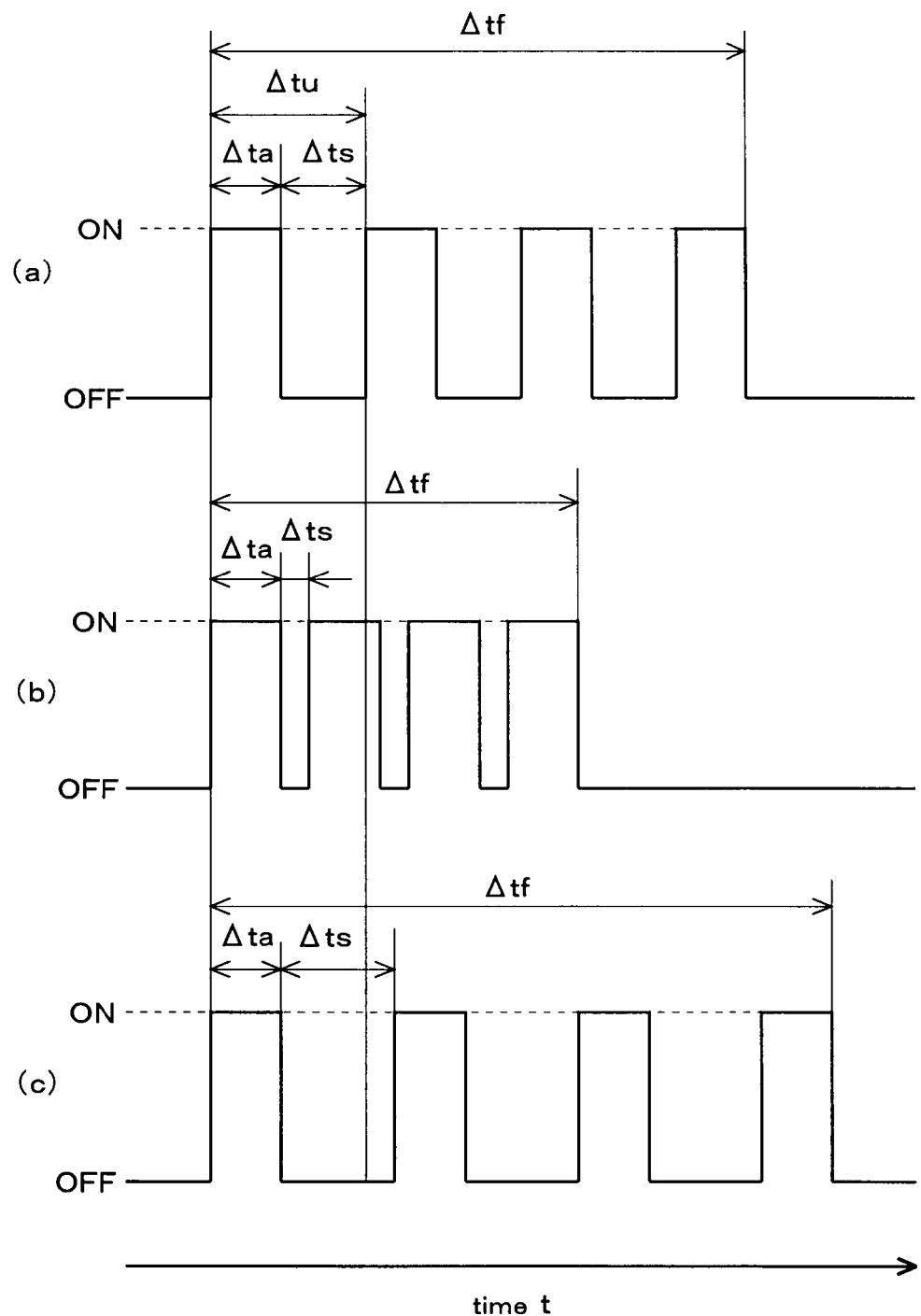
FIG. 3 shows fuel addition patterns used in executing a filter regeneration control according to embodiment 1. Diagram (a) in FIG. 3 shows a fuel addition pattern used in the case where the filter regeneration control is executed at a time when the level of activity of the oxidation catalyst falls within an optimum activity range. Diagram (b) in FIG. 3 shows a fuel addition pattern used in the case where the filter regeneration control is executed at a time when the level of activity of the oxidation catalyst falls within an over-active range. Diagram (c) in FIG. 3 shows a fuel addition pattern used in the case where the filter regeneration control is executed at a time when the level of activity of the oxidation catalyst falls within a low activity range.

FIG. 3 shows fuel addition patterns associated with levels of activity of the oxidation catalyst 4 at the time of executing the filter regeneration control. Diagrams (a), (b), and (c) show command signals sent from the ECU 10 to the fuel addition valve 6 when the filter regeneration control is executed. While the command signal is ON, fuel is added through the fuel addition valve 6, and while the signal is OFF, the addition of fuel through the fuel addition valve 6 is suspended. Diagram (a) in FIG. 3 shows a fuel addition pattern used in the case where the filter regeneration control is executed at a time when the level of activity of the oxidation catalyst 4 falls within the optimum activity range. Diagram (b) in FIG. 3 shows a fuel addition pattern used in the case where the filter regeneration control is executed at a time when the level of activity of the oxidation catalyst 4 falls within the over-active range. Diagram (c) in FIG. 3 shows a fuel addition pattern used in the case where the filter regeneration control is executed at a time when the level of activity of the oxidation catalyst 4 falls within the low activity range.

As described before, in the filter regeneration control according to this embodiment, the required addition quantity of fuel is added intermittently in multiple separate portions through the fuel addition valve 6. Here, a case in which the required addition quantity of fuel is added in four separate portions will be described by way of example. In FIG. 3, Δta represents the fuel addition period during which the addition of fuel is performed, and Δts represents the fuel addition suspension period during which the addition of fuel is suspended. As shown in FIG. 3, while the filter regeneration control is executed, the fuel addition periods Δta and the fuel addition suspension periods Δts alternate with each other.

Furthermore, in FIG. 3, Δtu represents a unit period, which is the sum of one fuel addition period Δta and one fuel addition suspension period Δts subsequent thereto, and Δtf represents the entire addition period, which is the period through which the intermittent addition of fuel is performed. The quantity of fuel added in one fuel addition period Δta will be referred to as a unit addition quantity. The period Δtf from the start of the first fuel addition period Δta to the end of the last fuel addition period Δta will be referred to as the entire addition period. In this embodiment, the entire addition period Δtf corresponds to the "period over which the addition of reducing agent is performed" or the "period over which the intermittent addition of reducing agent is performed" according to the present invention.

Here, the fuel addition period Δta, the fuel addition suspension period Δts, and the unit period Δtu in the fuel addition pattern in the case where the level of activity of the oxidation catalyst 4 falls within the optimum activity range (shown in diagram (a) in FIG. 3) will be referred to respectively as the standard addition period, the standard addition suspension period, and the standard unit period. The quantity of fuel added through the fuel addition valve 6 in the standard addition period will be referred to as the standard unit addition quantity.

In this embodiment, in the case where the filter regeneration control is executed at a time when the level of activity of the oxidation catalyst 4 falls within the over-active range, the intermittent addition of fuel through the fuel addition valve 6 is executed with a shortened fuel addition suspension period Δts shorter than the standard addition suspension period as shown in diagram (b) in FIG. 3.

This makes the quantity of fuel added through the fuel addition valve 6 in a time period equal to the standard unit period (i.e. the unit period Δtu in diagram (a) in FIG. 3) larger than the standard unit addition quantity. In consequence, the same amount of fuel is added through the fuel addition valve 6 in a shorter time than in the case where the filter regeneration control is executed at a time when the level of activity of the oxidation catalyst 4 falls within the optimum activity range. In other words, fuel is added more intensively than in the case where the filter regeneration control is executed at a time when the level of activity of the oxidation catalyst 4 falls within the optimum activity range.

Figure 4:
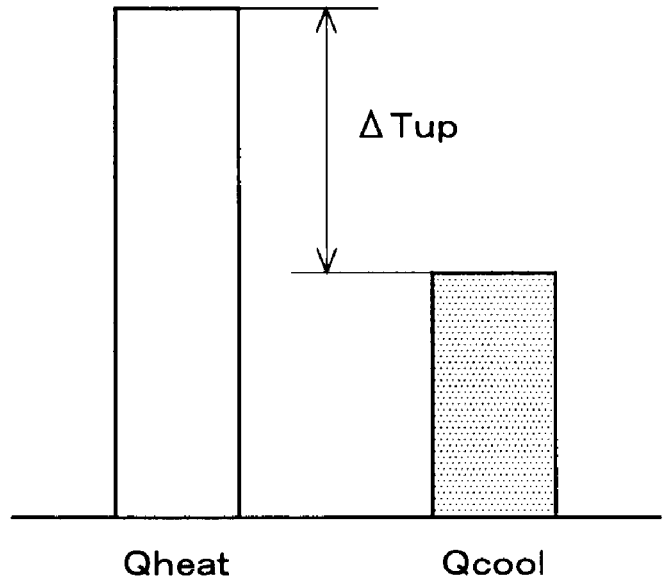
FIG. 4 shows the quantity of cooling and the quantity of heating of the oxidation catalyst in the case where the addition of fuel through a fuel addition valve is performed according to embodiment 1. Diagram (A) in FIG. 4 is for a case in which the addition of fuel is performed with the fuel addition pattern shown in diagram (a) in FIG. 3, and Diagram (B) in FIG. 4 is for a case in which the addition of fuel is performed with the fuel addition pattern shown in diagram (b) in FIG. 3
Figure 4:
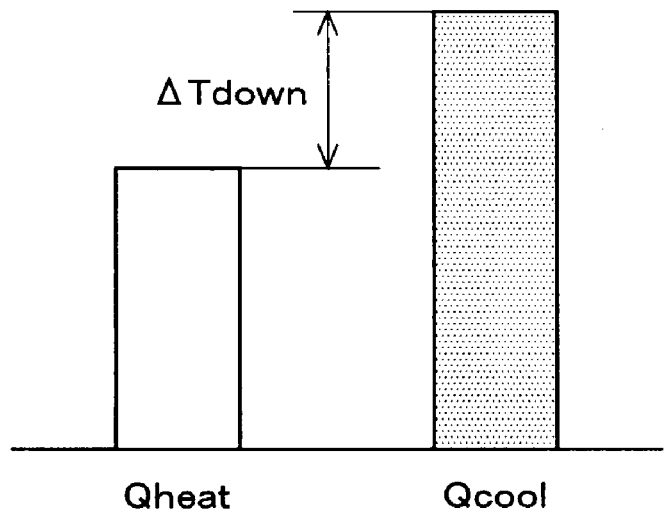

The effect of the more intensive addition of fuel through the fuel addition valve 6 will be described with reference to FIG. 4. In this embodiment, liquid fuel is added through the fuel addition valve 6. The fuel in a liquid state supplied to the oxidation catalyst 4 vaporizes in the oxidation catalyst 4. A portion of the vaporized fuel is oxidized in the oxidation catalyst 4, and the oxidation catalyst 4 is heated by the heat of oxidation generated thereby.

Meanwhile, the temperature of the fuel in a liquid state is lower than the temperature of the oxidation catalyst 4. In consequence, as the fuel in a liquid state reaches the oxidation catalyst 4, the oxidation catalyst 4 is cooled by the fuel. In addition, the oxidation catalyst 4 is also cooled due to the heat of vaporization used in the vaporization of fuel in the oxidation catalyst 4.

Thus, as the addition of fuel through the fuel addition valve 6 is performed, while the oxidation catalyst 4 is heated by the heat of oxidation generated in the oxidation of fuel, the oxidation catalyst 4 is cooled by the liquid fuel and the heat of vaporization used in the vaporization of fuel. FIG. 4 shows the quantity of heating Qheat and the quantity of cooling Qcool in this process. Diagram (A) in FIG. 4 shows those in a case in which the addition of fuel is performed with the fuel addition pattern shown in diagram (a) in FIG. 3, and diagram (B) in FIG. 4 shows those in a case where the addition of fuel is performed with the fuel addition pattern shown in diagram (b) in FIG. 3.

In the fuel addition pattern shown in diagram (a) in FIG. 3, the fuel addition suspension period Δts is set to the standard suspension period in order to promote the oxidation of the fuel added during the fuel addition period Δta in the oxidation catalyst 4. Thus, a sufficient amount of oxygen is supplied to the oxidation catalyst 4 during the fuel addition suspension period Δts, and therefore the oxidation of fuel in the oxidation catalyst 4 is promoted. In consequence, the quantity of heating Qheat is larger than the quantity of cooling Qcool as shown in diagram (A) in FIG. 4, and the difference between the quantity of heating Qheat and the quantity of cooling Qcool provides a temperature increase Δtup in the oxidation catalyst 4. In this case also, an excessive temperature rise of the oxidation catalyst 4 hardly occurs if the level of activity of the oxidation catalyst 4 falls within the optimum activity range.

On the other hand, in the case where fuel is added to the oxidation catalyst 4 with the fuel addition pattern shown in diagram (b) in FIG. 3 in a more intensive manner than with the fuel addition pattern shown in diagram (a) in FIG. 3, the oxidation catalyst 4 tends to be cooled by the fuel. In addition, a decrease in the quantity of oxygen supplied to the oxidation catalyst 4 makes it harder to promote the oxidation of fuel and leads to an increase in the heat of vaporization used in the vaporization of fuel per unit time. In consequence, the quantity of cooling Qcool becomes larger than the quantity of heating Qheat as shown in diagram (B) in FIG. 4, and the difference between the quantity of cooling Qcool and the quantity of heating Qheat provides a temperature decrease ΔTdown in the oxidation catalyst 4.

Therefore, even in the case where the level of activity of the oxidation catalyst 4 falls within the over-active range at the time when the filter regeneration control is executed, an excessive temperature rise of the oxidation catalyst 4 can be prevented by performing the addition of fuel through the fuel addition valve 6 with the fuel addition pattern shown in diagram (b) in FIG. 3 to supply fuel more intensively to the oxidation catalyst 4.

In connection with this, as the temperature of the oxidation catalyst 4 is decreased by performing the addition of fuel with the fuel addition pattern shown in diagram (b) in FIG. 3, the level of activity of the oxidation catalyst 4 shifts from the over-active range to the optimum activity range. When the level of activity of the oxidation catalyst 4 enters the optimum activity range, the fuel addition pattern used in executing the filter regeneration control is changed to the fuel addition pattern shown in diagram (a) in FIG. 3.

In this embodiment, in the case where the filter regeneration control is executed at a time when the level of activity of the oxidation catalyst 4 falls within the low activity range, the intermittent addition of fuel through the fuel addition valve 6 is performed with an elongated fuel addition suspension period Δts longer than the standard addition suspension period as shown in diagram (c) in FIG. 3.

This makes the amount of oxygen supplied to the oxidation catalyst 4 during the fuel addition suspension period Δts larger than in the case where the addition of fuel is performed with the fuel addition pattern shown in diagram (a) in FIG. 3. Therefore, the oxidation of fuel in the oxidation catalyst 4 tends to be promoted more strongly. In consequence, the temperature rise of the oxidation catalyst 4 can be promoted.

In connection with this, as the temperature of the oxidation catalyst 4 is increased by performing the addition of fuel with the fuel addition pattern shown in diagram (c) in FIG. 3, the level of activity of the oxidation catalyst 4 shifts from the low activity range to the optimum activity range. When the level of activity of the oxidation catalyst 4 enters the optimum activity range, the fuel addition pattern used in executing the filter regeneration control is changed to the fuel addition pattern shown in diagram (a) in FIG. 3.

In the execution of the filter regeneration control according to this embodiment, the total amount of fuel added through the entire addition period Δtf is equal to the required fuel addition quantity irrespective of which fuel addition pattern among those shown in diagrams (a), (b), and (c) in FIG. 3 is used in performing the addition of fuel through the fuel addition valve 6. Therefore, the temperature of the filter 5 can be controlled to a target temperature by selecting whichever fuel addition pattern that is suitable for the level of activity of the oxidation catalyst 4.

Figure 5:
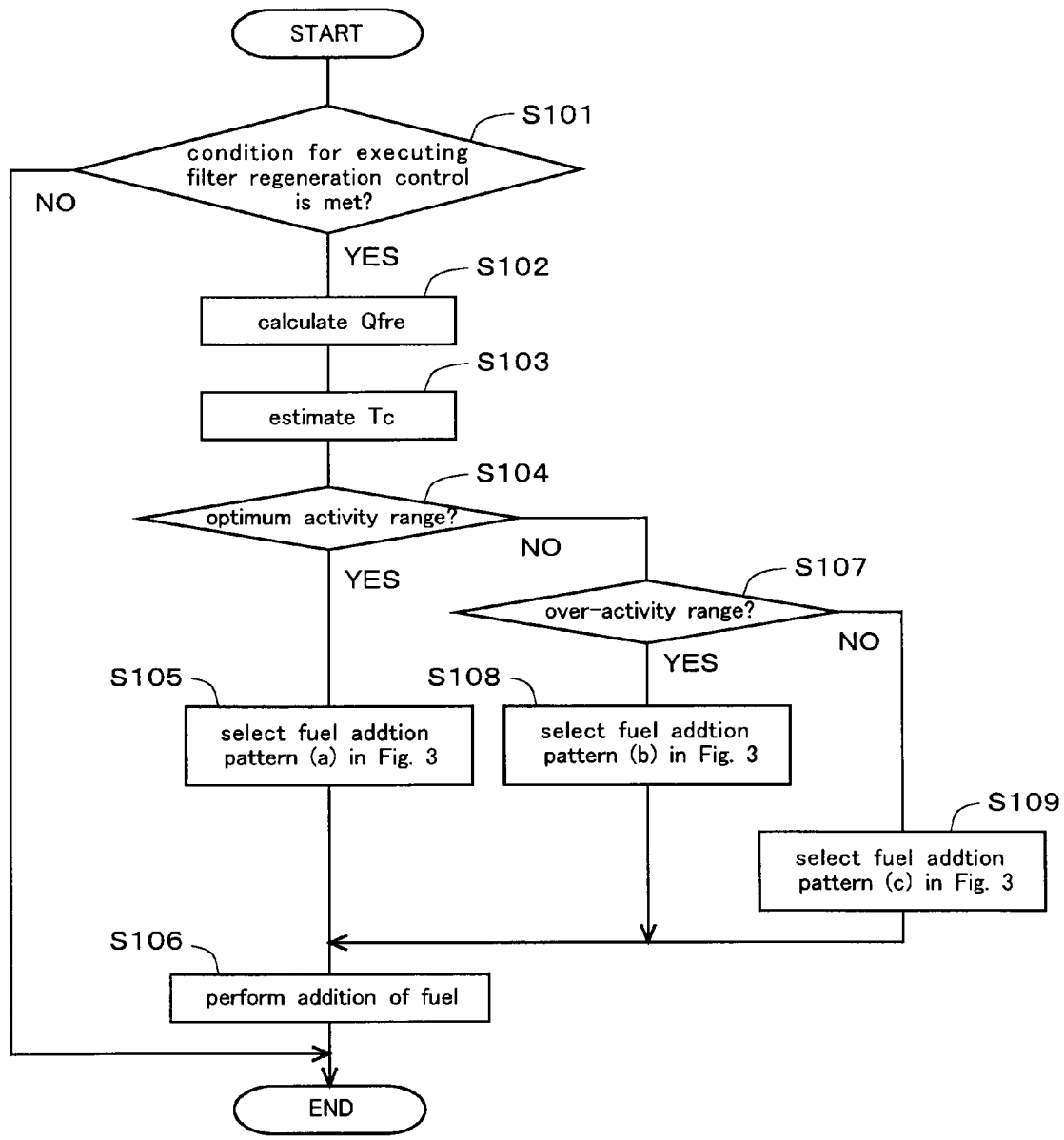
FIG. 5 is a flow chart showing a routine of the filter regeneration control according to embodiment 1.

Here, a routine of the filter regeneration control according to this embodiment will be described with reference to the flow chart shown in FIG. 5. This routine is stored in the ECU 10 in advance and executed at predetermined intervals during the operation of the internal combustion engine 1.

In this routine, first in step S101, the ECU 10 determines whether or not a condition for executing the filter regeneration control is met. Here, it may be determined that the condition for executing the filter regeneration control is met when the amount of the PM trapped in the filter 5 becomes equal to or larger than a specific trapped amount. The amount of the PM trapped in the filter 5 can be estimated based on the history of the operation state of the internal combustion engine 1 etc. If the determination in step S101 is affirmative, the ECU 10 proceeds to step S102, and if the determination is negative, the ECU 10 once terminates execution of this routine.

In step S102, the ECU 10 calculates the required fuel addition quantity Qfre based on the operation state of the internal combustion engine 1 and the present temperature of the filter 5 etc.

Then, the ECU 10 proceeds to step S103, where it estimates the temperature Tc of the oxidation catalyst 4 based on the operation state of the internal combustion engine 1 etc. In this connection, a temperature sensor may be provided in the exhaust passage 2 immediately downstream of the oxidation catalyst 4, and the temperature Tc of the oxidation catalyst 4 may be estimated based on the measurement value of this temperature sensor.

Then, the ECU 10 proceeds to step S104, where it determines, based on the temperature Tc of the oxidation catalyst 4, whether or not the level of activity of the oxidation catalyst 4 falls within the optimum activity range. If the determination in step S104 is affirmative, the ECU 10 proceeds to step S105, and if the determination is negative, the ECU 10 proceeds to step S107.

In step S105, the ECU 10 selects the addition pattern shown in diagram (a) in FIG. 3 as the fuel addition pattern with the fuel addition valve 6.

Then, the ECU 10 proceeds to step S106, where it executes the addition of fuel through the fuel addition valve 6. Thereafter, the ECU 10 once terminates execution of this routine.

On the other hand, in step S107, the ECU 10 determines, based on the temperature Tc of the oxidation catalyst 4, whether or not the level of activity of the oxidation catalyst 4 falls within the over-active range. If the determination in step S107 is affirmative, the ECU proceeds to step S108. If the determination in step S107 is negative, the ECU 10 determines that the level of activity of the oxidation catalyst 4 falls within the low activity range and proceeds to step S109.

In step S108, the ECU 10 selects the addition pattern shown in diagram (b) in FIG. 3 as the fuel addition pattern with the fuel addition valve 6. Thereafter, the ECU 10 proceeds to step S106.

In step S109, the ECU 10 selects the addition pattern shown in diagram (c) in FIG. 3 as the fuel addition pattern with the fuel addition valve 6. Thereafter, the ECU 10 proceeds to step S106.

With the above-described routine, when the filter regeneration control is executed, the addition of fuel through the fuel addition valve 6 can be performed with a fuel addition pattern selected in accordance with the level of activity of the oxidation catalyst 4.

Although a case in which the addition of fuel in executing the filter regeneration control is divided into four portions has been described by way of example, the number of divided portions is not limited to four.

In this embodiment, the threshold value (or the lower limit value) of the level of activity of the oxidation catalyst 4 in selecting the pattern shown in diagram (b) in FIG. 3 as the fuel addition pattern in executing the filter regeneration control may be set to a value higher than level L1 and equal to or lower than level L2. That is to say, the addition of fuel through the fuel addition valve 6 may be performed using the pattern shown in diagram (b) in FIG. 3 as the fuel addition pattern at a time when the level of activity of the oxidation catalyst 4 falls within the optimum activity range during the execution of the filter regeneration control.

For example, in the case where the threshold value of the level of activity of the oxidation catalyst 4 in selecting the pattern shown in diagram (b) in FIG. 3 as the fuel addition pattern is set to a relatively low level in the optimum activity range, it is possible to control the temperature of the oxidation catalyst 4 to a relatively low temperature while promoting the oxidation of fuel in the oxidation catalyst 4 during the execution of the filter regeneration control. Therefore, even if the engine load of the internal combustion engine 1 increases abruptly, an excessive temperature rise of the oxidation catalyst 4 can be prevented from occurring.

On the other hand, in the case where the threshold value of the level of activity of the oxidation catalyst 4 in selecting the pattern shown in diagram (b) in FIG. 3 as the fuel addition pattern is set to a relatively high level in the optimum activity range, an excessive temperature rise of the oxidation catalyst 4 can be prevented from occurring with a higher probability than in the case where the threshold value is set to level L2, and in addition the temperature of the oxidation catalyst 4 during the execution of the filter regeneration control can be maintained at relatively high temperatures. Therefore, the oxidation of fuel in the oxidation catalyst 4 can be promoted more strongly than in the case where the threshold value of the level of activity of the oxidation catalyst 4 in selecting the pattern shown in diagram (b) in FIG. 3 as the fuel addition pattern is set to a relatively low level in the optimum activity range.

<Modification of Fuel Addition Pattern>

In the following, a modification of the fuel addition pattern in the case where the level of activity of the oxidation catalyst 4 falls within the over-active range at the time of executing the filter regeneration control will be described with reference to FIGS. 6 to 8.

Figure 6:
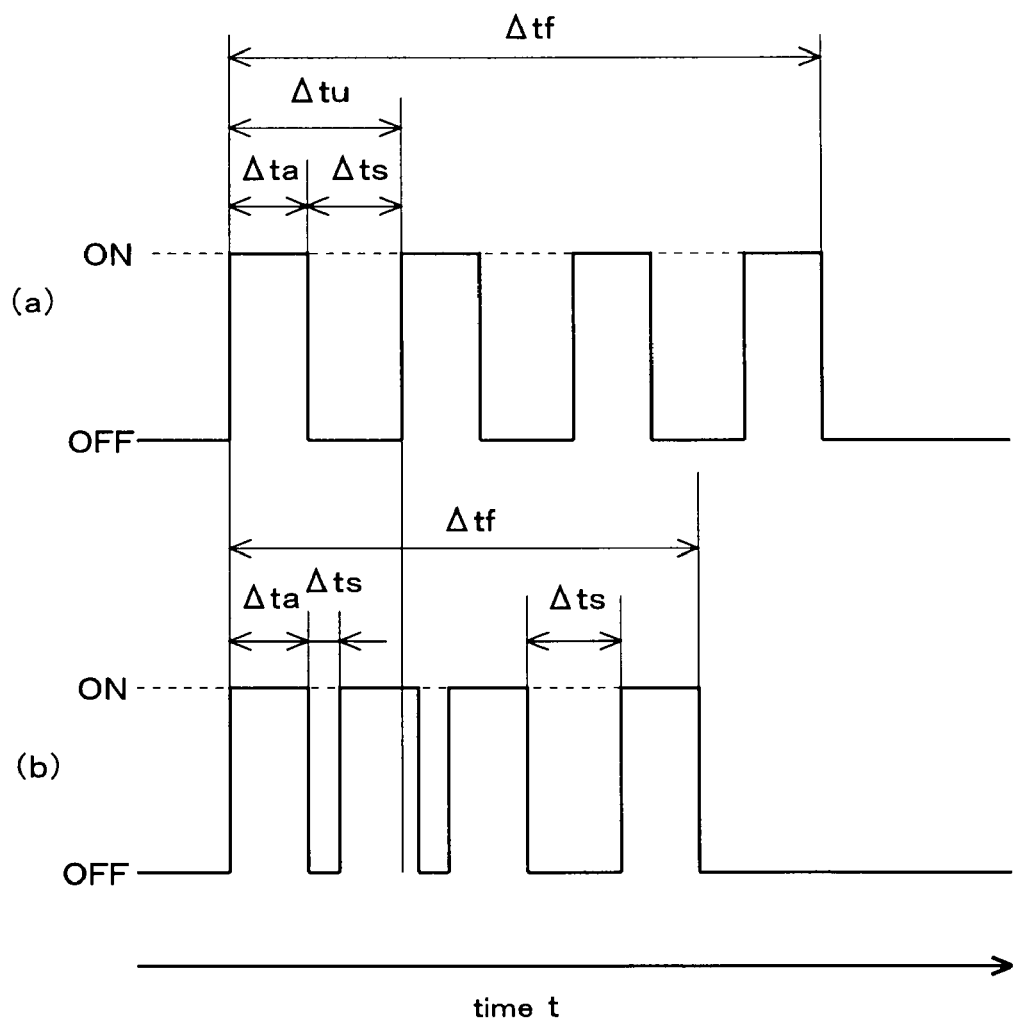
FIG. 6 shows fuel addition patterns used in executing a filter regeneration control according to a first modification of embodiment 1. Diagram (a) in FIG. 6 shows a fuel addition pattern used in the case where the filter regeneration control is executed at a time when the level of activity of the oxidation catalyst falls within an optimum activity range. Diagram (b) in FIG. 6 shows a fuel addition pattern used in the case where the filter regeneration control is executed at a time when the level of activity of the oxidation catalyst falls within an over-active range.

FIG. 6 shows a first modification of the fuel addition patterns used in executing the filter regeneration control. Diagram (a) in FIG. 6 shows a fuel addition pattern used in the case where the filter regeneration control is executed at a time when the level of activity of the oxidation catalyst 4 falls within the optimum activity range. This pattern shown in diagram (a) in FIG. 6 is the same as the fuel addition pattern shown in diagram (a) in FIG. 3. Diagram (b) in FIG. 6 shows a fuel addition pattern used in the case where the filter regeneration control is executed at a time when the level of activity of the oxidation catalyst 4 falls within the over-active range.

In the fuel addition pattern shown in diagram (b) in FIG. 3, all the fuel addition suspension periods Δts in the entire addition period Δtf are made shorter than the standard addition suspension period. On the other hand, as shown in diagram (b) in FIG. 6, in the fuel addition pattern of this modification used in the case where the filter regeneration control is executed at a time when the level of activity of the oxidation catalyst 4 falls within the over-active range, the fuel addition suspension periods Δts are made shorter than the standard addition suspension period only in a portion of the entire addition period Δtf.

In this case also, in the period in which the fuel addition suspension period Δts is made shorter than the standard addition suspension period, the quantity of fuel added through the fuel addition valve 6 in a time period equal to the standard unit period becomes larger than the standard unit addition quantity. In other words, in a portion of the period over which the intermittent addition of fuel through the fuel addition valve 6 is performed, fuel is added more intensively than in the case where the filter regeneration control is executed at a time when the level of activity of the oxidation catalyst 4 falls within the optimum activity range.

In consequence, cooling of the oxidation catalyst 4 is promoted in a portion of the period over which the intermittent addition of fuel through the fuel addition valve 6 is performed. Therefore, an excessive temperature rise of the oxidation catalyst 4 can also be prevented from occurring by performing the addition of fuel with the pattern shown in diagram (b) in FIG. 6.

Figure 7:
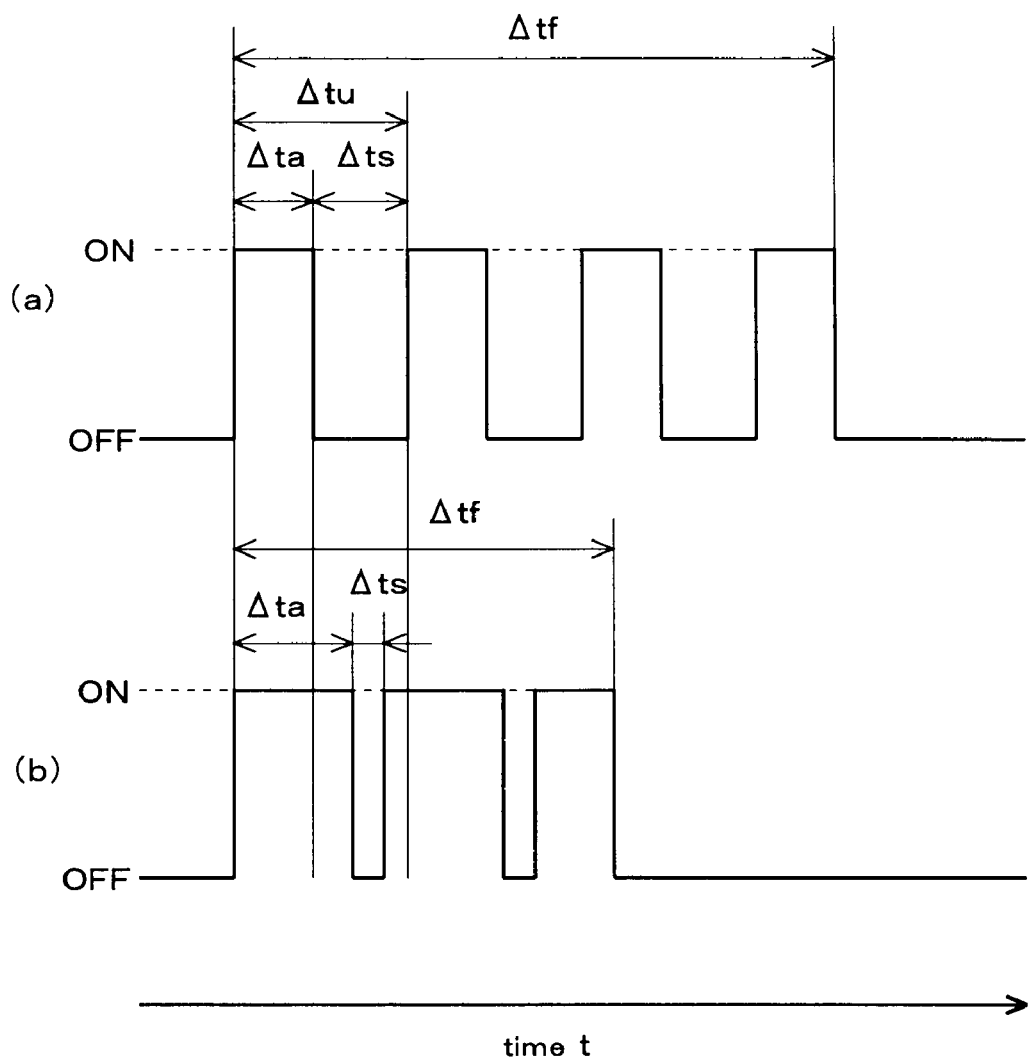
FIG. 7 shows fuel addition patterns used in executing a filter regeneration control according to a second modification of embodiment 1. Diagram (a) in FIG. 7 shows a fuel addition pattern used in the case where the filter regeneration control is executed at a time when the level of activity of the oxidation catalyst falls within an optimum activity range. Diagram (b) in FIG. 7 shows a fuel addition pattern used in the case where the filter regeneration control is executed at a time when the level of activity of the oxidation catalyst falls within an over-active range.

FIG. 7 shows a second modification of the fuel addition pattern used in executing the filter regeneration control. Diagram (a) in FIG. 7 shows a fuel addition pattern used in the case where the filter regeneration control is executed at a time when the level of activity of the oxidation catalyst 4 falls within the optimum activity range. This pattern shown in diagram (a) in FIG. 7 is the same as the fuel addition pattern shown in diagram (a) in FIG. 3. Diagram (b) in FIG. 7 shows a fuel addition pattern used in the case where the filter regeneration control is executed at a time when the level of activity of the oxidation catalyst 4 falls within the over-active range.

In the fuel addition pattern of this modification used in the case where the filter regeneration control is executed at a time when the level of activity of the oxidation catalyst 4 falls within the over-active range, the fuel addition suspension period Δts is made shorter than the standard addition suspension period, as shown in diagram (b) in FIG. 7. In addition, the number of divisions of the addition of fuel is decreased to three, and some of the fuel addition periods Δta are made longer than the standard addition period.

Consequently, the quantity of fuel added through the fuel addition valve 6 in a time period equal to the standard unit time further becomes larger that in the case where intermittent addition of fuel is performed with the fuel addition pattern shown in diagram (b) in FIG. 3. In other words, fuel is added more intensively. In consequence, cooling of the oxidation catalyst 4 can be promoted more strongly. Therefore, an excessive temperature rise of the oxidation catalyst 4 can be prevented from occurring more effectively.

In the fuel addition pattern of this modification used in the case where the filter regeneration control is executed at a time when the level of activity of the oxidation catalyst 4 falls within the over-active range, the number of divisions of the addition of fuel may be decreased to two. In this case, each fuel addition period Δta is further elongated.

In the fuel addition pattern shown in diagram (b) in FIG. 7, the fuel addition suspension period Δts has been made shorter than the standard addition suspension period. However, the number of divisions of the addition of fuel may be decreased and the fuel addition period Δta may be made longer than the standard addition period with the fuel addition suspension period Δts being maintained to be equal to the standard addition suspension period.

In this case also, the quantity of fuel added through the fuel addition valve 6 in a time period equal to the standard unit time becomes larger than the unit addition quantity in the case of the fuel addition pattern shown in diagram (a) in FIG. 7. In other words, in a portion of the period over which the intermittent addition of fuel through the fuel addition valve 6 is performed, fuel is added more intensively than in the case where the filter regeneration control is executed at a time when the level of activity of the oxidation catalyst 4 falls within the optimum activity range. Therefore, an excessive temperature rise of the oxidation catalyst 4 can be prevented from occurring.

Figure 8:
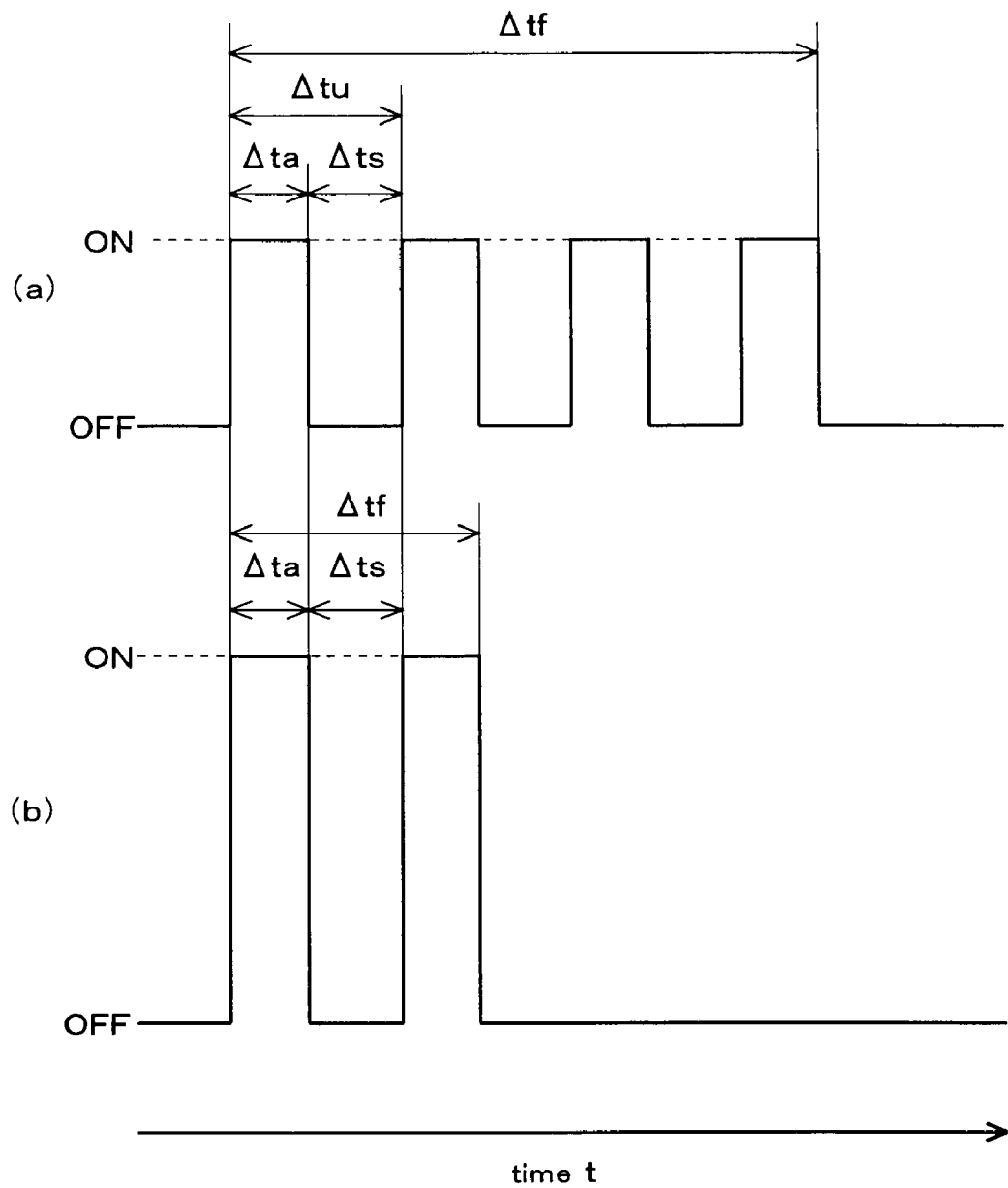
FIG. 8 shows fuel addition patterns used in executing a filter regeneration control according to a third modification of embodiment 1. Diagram (a) in FIG. 8 shows a fuel addition pattern used in the case where the filter regeneration control is executed at a time when the level of activity of the oxidation catalyst falls within an optimum activity range. Diagram (b) in FIG. 8 shows a fuel addition pattern used in the case where the filter regeneration control is executed at a time when the level of activity of the oxidation catalyst falls within an over-active range.

FIG. 8 shows a third modification of the fuel addition patterns used in executing the filter regeneration control in accordance with the level of activity of the oxidation catalyst 4. Diagram (a) in FIG. 8 shows a fuel addition pattern used in the case where the filter regeneration control is executed at a time when the level of activity of the oxidation catalyst 4 falls within the optimum activity range. This pattern shown in diagram (a) in FIG. 8 is the same as the fuel addition pattern shown in diagram (a) in FIG. 3. Diagram (b) in FIG. 8 shows a fuel addition pattern used in the case where the filter regeneration control is executed at a time when the level of activity of the oxidation catalyst 4 falls within the over-active range.

In the fuel addition pattern of this modification used in the case where the filter regeneration control is executed at a time when the level of activity of the oxidation catalyst 4 falls within the over-active range, the fuel addition period Δts and the fuel addition suspension period Δta are respectively equal to the standard addition period and the standard addition suspension period, and the number of divisions of the addition of fuel is decreased to two, as shown in diagram (b) in FIG. 8. In addition, the quantity of fuel added per unit time during each fuel addition period Δta is increased. (In FIG. 8, the height of the command signal in the periods in which it is ON represents the quantity of fuel added per unit time.)

In this case also, the quantity of fuel added through the fuel addition valve 6 in a time period equal to the standard unit period becomes larger than the standard unit addition quantity. In other words, fuel is added more intensively than in the case where the filter regeneration control is executed at a time when the level of activity of the oxidation catalyst 4 falls within the optimum activity range. In consequence, cooling of the oxidation catalyst 4 can be promoted. Therefore, an excessive temperature rise of the oxidation catalyst 4 can be prevented from occurring.

In this modification, in the fuel addition pattern used in the case where the filter regeneration is executed at a time when the level of activity of the oxidation catalyst 4 falls within the over-activation range, the addition of fuel may be performed in one shot without dividing it into portions. In this case, the fuel addition period Δta is made longer than that in the case where the addition of fuel is divided into two portions, and/or the quantity of fuel added per unit time is made further larger than that in the case where the addition of fuel is divided into two portions. Thereby, fuel can be added more intensively.

In the embodiment, the required addition quantity of fuel is added intermittently in multiple separate portions through the fuel addition valve 6 during the execution of the filter regeneration control. However, the required addition quantity of fuel may be added by one continuous addition of fuel without dividing it into portions. In this case, in the case where the filter regeneration control is executed at a time when the level of activity of the oxidation catalyst 4 falls within the over-active range, the quantity of fuel added per unit time is made larger than that in the case where the filter regeneration control is executed at a time when the level of activity of the oxidation catalyst 4 falls within the optimum activity range, in at least a portion of the period over which the addition of fuel is performed.

Thereby, in the case where the filter regeneration control is executed at a time when the level of activity of the oxidation catalyst 4 falls within the over-active range, fuel is added more intensively than in the case where filter regeneration control is executed at a time when the level of activity of the oxidation catalyst 4 falls within the optimum activity range, in at least a portion of the period over which the addition of fuel is performed. Therefore, an excessive temperature rise of the oxidation catalyst 4 can be prevented from occurring.

Embodiment 2

Figure 9:
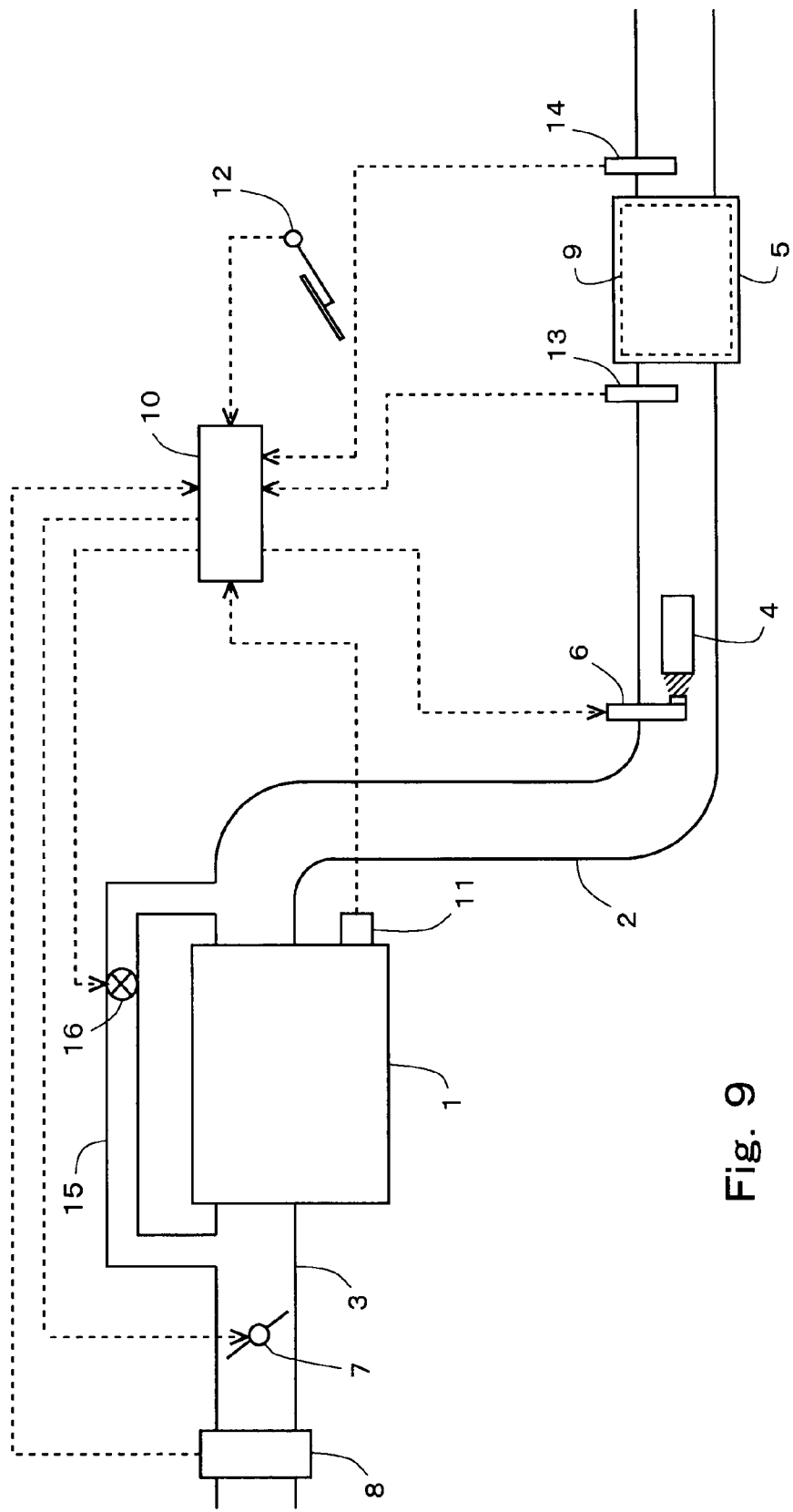
FIG. 9 is a diagram showing the general configuration of an air-intake and exhaust system of an internal combustion engine according to embodiment 2.

FIG. 9 is a diagram showing the general configuration of the air-intake and exhaust system of an internal combustion engine according to this embodiment. In this embodiment, the outer diameter of the oxidation catalyst 4 is smaller than the inner diameter of the exhaust passage 2. This means that the cross sectional area of the oxidation catalyst 4 in a plane perpendicular to the direction of flow of the exhaust gas is smaller than the cross sectional area of the exhaust passage 2 in a plane perpendicular to the direction of flow of the exhaust gas. With this design, the exhaust gas flows between the outer circumferential surface of the oxidation catalyst 4 and the inner circumferential surface of the exhaust passage 2.

In this embodiment also, a fuel addition valve 6 is provided in the exhaust passage 2 immediately upstream of the oxidation catalyst 4. Thus, at least a portion of the fuel injected from the fuel injection port of the fuel addition valve 6 reaches the oxidation catalyst 4 in a liquid state. Fuel is injected from the fuel injection port of the fuel addition valve 6 toward the upstream end surface of the oxidation catalyst 4, and substantially all of the injected fuel flows into the oxidation catalyst 4 (the sprayed fuel being represented by the hatched portion in FIG. 9).

since the components other than described above are the same as those in embodiment 1, like components will be denoted by like reference numerals to omit descriptions thereof.

In this embodiment also, a filter regeneration control similar to that in embodiment 1 is executed. In the case of the construction of this embodiment, the flow rate of the exhaust gas flowing into the oxidation catalyst 4 is lower than that in the construction of embodiment 1. In consequence, heating of the oxidation catalyst 4 by the heat of oxidation generated in the oxidation of fuel tends to be facilitated. Therefore, in the case where the level of activity of the oxidation catalyst 4 falls within the over-active range at the time when regeneration control is executed, an excessive temperature rise of the oxidation catalyst 4 is likely to occur if the addition of fuel is performed with the fuel addition pattern same as that is used in the case where the level of activity of the oxidation catalyst 4 falls within the optimum activity range.

In view of the above, in this embodiment also, the pattern of the addition of fuel through the fuel addition valve 6 used in executing the filter regeneration control is changed in accordance with the level of activity of the oxidation catalyst 4 as with embodiment 1. Thus, in the case where the filter regeneration control is executed at a time when the level of activity of the oxidation catalyst 4 falls within the over-active range, fuel is added more intensively than in the case where the filter regeneration control is executed at a time when the level of activity of the oxidation catalyst 4 falls within the optimum activity range, in at least a portion of the period over which the addition of fuel is performed (i.e. during the entire addition period Δtf).

In the case of the configuration of this embodiment, the quantity of fuel supplied per unit area of the oxidation catalyst 4 when fuel is added toward the upstream end surface of the oxidation catalyst 4 is larger than that in the case where all of the exhaust gas flowing into the filter 5 passes through the oxidation catalyst 4, which is the case with embodiment 1. In consequence, when fuel is added through the fuel addition valve 6 more intensively, the oxidation catalyst 4 tends to be cooled more efficiently. Therefore, the effect of preventing an excessive temperature rise of the oxidation catalyst 4 is enhanced.

<Modification>

Figure 10:
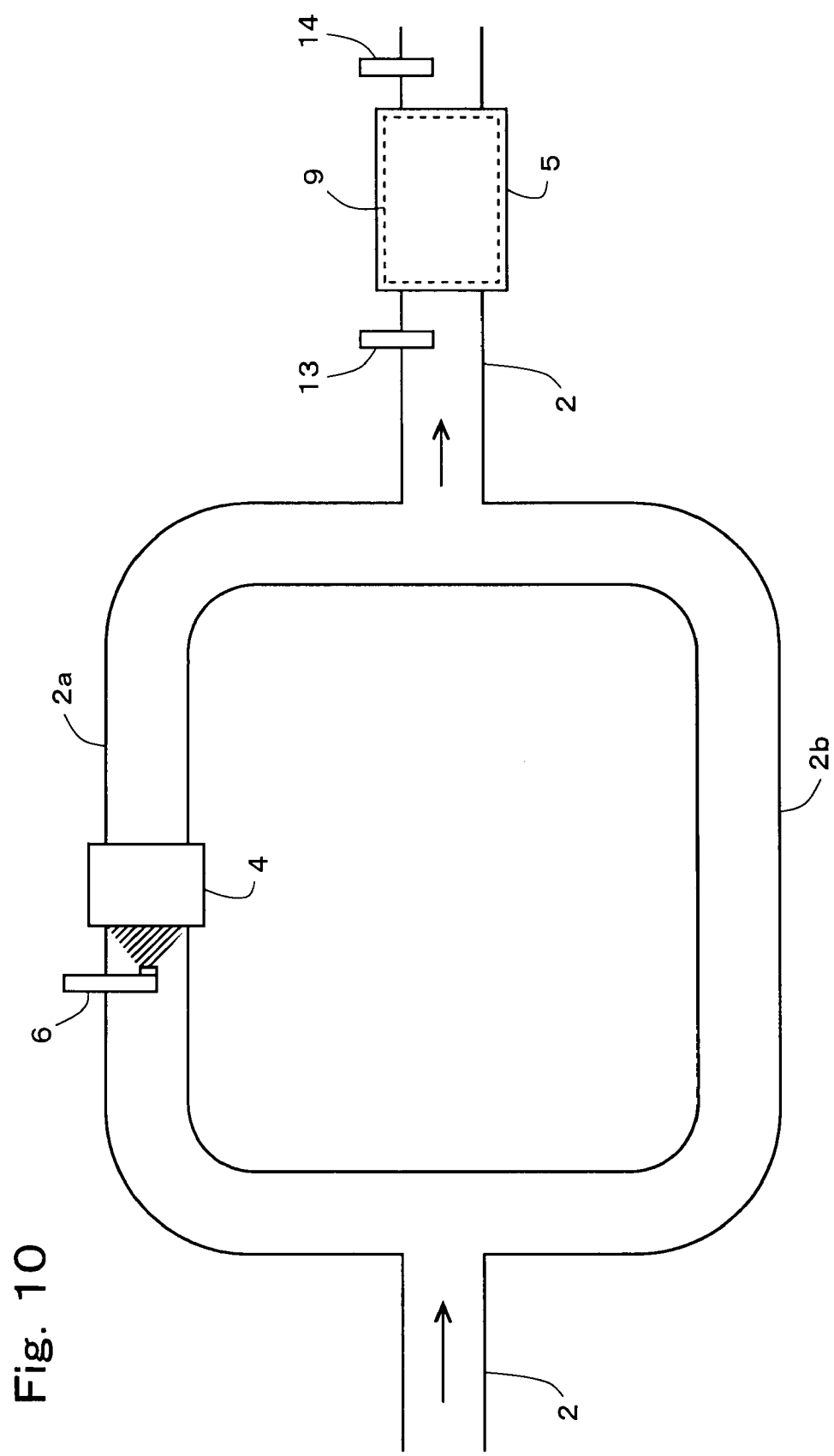
FIG. 10 is a diagram showing the general configuration of an exhaust passage according to a modification of embodiment 2.

A modification of this embodiment will be described. FIG. 10 is a diagram showing the general configuration of the exhaust passage according to the modification. In FIG. 10, the arrows indicate the direction in which the exhaust gas flows, and the upstream end of the exhaust passage 2 is connected to the internal combustion engine 1 as is the case with the configuration shown in FIG. 9.

The exhaust passage 2 in this embodiment forks into a first branch passage 2a and a second branch passage 2b at a certain place. The first branch passage 2a and the second branch passage 2b merge in the downstream. An oxidation catalyst 4 is provided in the first branch passage 2a, and no catalyst is provided in the second branch passage 2b.

The outer diameter of the oxidation catalyst 4 is larger than the portion of the first branch passage 2a in which the oxidation catalyst is not provided. A fuel addition valve 6 is provided in the first branch passage 2a immediately upstream of the oxidation catalyst 4, and liquid fuel is injected from a fuel injection port of the fuel addition valve 6 toward the upstream end surface of the oxidation catalyst 4, as is the case with embodiment 1. Thus, at least a portion of the fuel injected from the fuel injection port of the fuel addition valve 6 reaches the oxidation catalyst 4 in a liquid state (the sprayed fuel being represented by the hatched portion in FIG. 10).

An air-fuel ratio sensor 13, a filter 5, and a temperature sensor 14 are provided in the exhaust passage 2 downstream of the downstream merging portion of the first branch passage 2a and the second branch passage 2b.

Since the components other than described above are the same as those in the configuration shown in FIG. 1, illustrations and descriptions thereof will be omitted.

In the case of the configuration of this modification, the exhaust gas flowing in the exhaust passage 2 flows separately in the first branch passage 2a and the second branch passage 2b. Therefore, not all of the exhaust gas flowing into the filter 5 but a portion thereof passes through the oxidation catalyst 4. On the other hand, all of the fuel added through the fuel addition valve 6 is supplied to the oxidation catalyst 4.

Therefore, in this modification also as with the above described case, in the case where the level of activity of the oxidation catalyst 4 falls within the over-active range at the time when regeneration control is executed, an excessive temperature rise of the oxidation catalyst 4 is likely to occur if the addition of fuel is performed with the fuel addition pattern same as that used in the case where the level of activity of the oxidation catalyst 4 falls within the optimum activity range.

In view of the above, in this modification also, the pattern of the addition of fuel through the fuel addition valve 6 used in executing the filter regeneration control is changed in accordance with the level of activity of the oxidation catalyst 4, like in the above-described case. Thereby, an excessive temperature rise of the oxidation catalyst 4 can be prevented from occurring.

Embodiment 3

Figure 11:
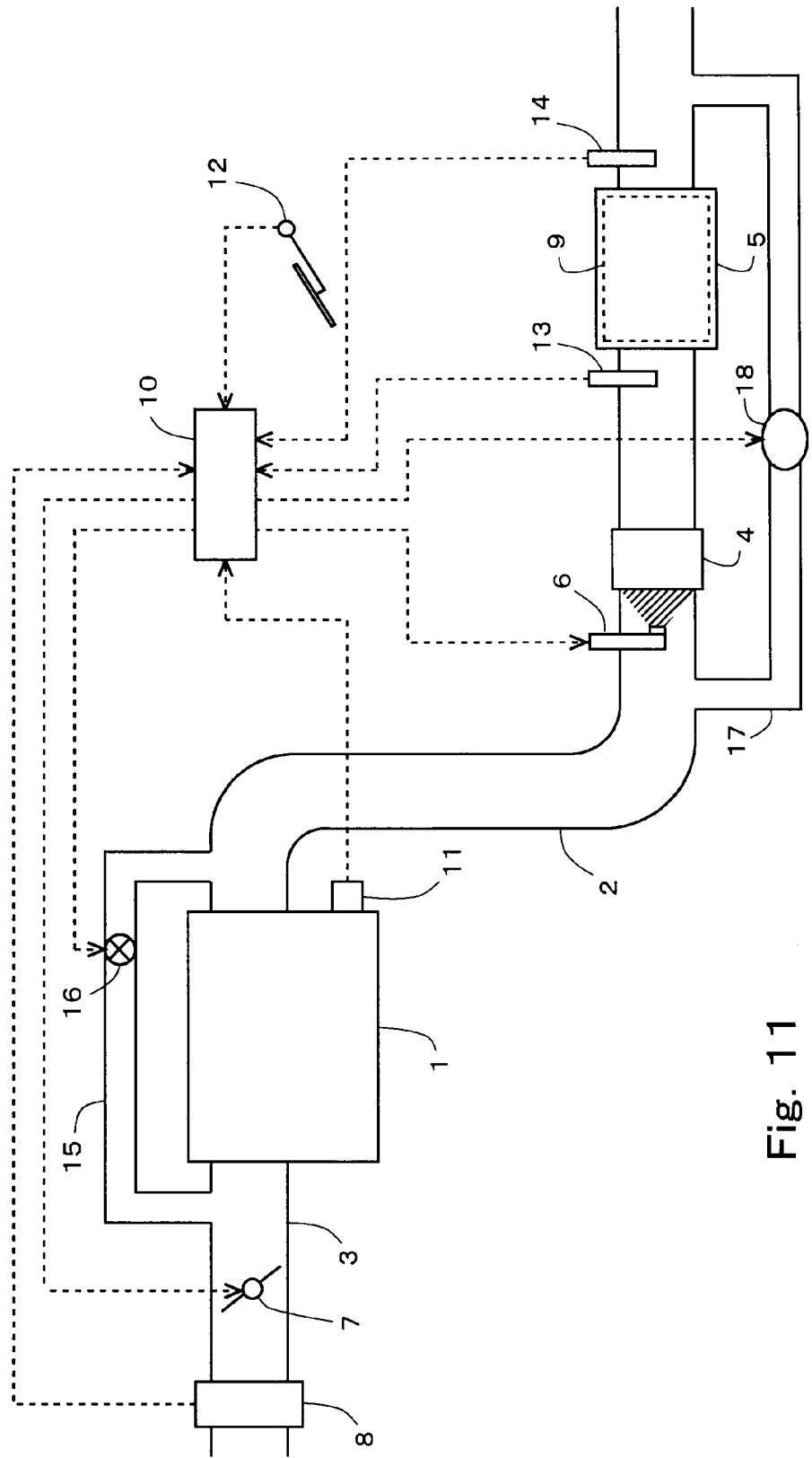
FIG. 11 is a diagram showing the general configuration of an air-intake and exhaust system of an internal combustion engine according to embodiment 3.

FIG. 11 is a diagram showing the general configuration of the air-intake and exhaust system of an internal combustion engine according to this embodiment. In this embodiment, there is provided an exhaust gas back-flow passage 17, one end of which is connected to the exhaust passage 2 downstream of the filter 5, and the other end of which is connected to the exhaust passage 2 immediately upstream of the fuel addition valve 6. The exhaust gas back-flow passage 17 is provided with a pump 18 that pumps the exhaust gas from one end to the other end. As the pump 18 operates, a portion of the exhaust gas flowing in the exhaust passage 2 downstream of the filter 5 is brought back to a place immediately upstream of the fuel addition valve through the back-flow passage 17. The pump 18 is electrically connected with the ECU 10 and controlled by it. Since the components other than described above are the same as those in embodiment 1, like components will be denoted by like reference numerals to omit descriptions thereof.

In this embodiment also, a filter regeneration control similar to that in embodiment 1 is executed. That is to say, the pattern of the addition of fuel through the fuel addition valve 6 in executing the filter regeneration control is changed in accordance with the level of activity of the oxidation catalyst 4. In this embodiment, in the case where the level of activity of the oxidation catalyst 4 falls within the over-active range at the time when filter regeneration control is executed, the pump 18 is caused to operate.

As the pump 18 operates to bring the exhaust gas flowing in the exhaust passage 2 downstream of the filter 5 back to a place immediately upstream of the fuel addition valve 6, the flow rate of the exhaust gas passing through the oxidation catalyst 4 increases. This leads to an increase in the quantity of heat carried away by the exhaust gas. In this embodiment, therefore, an excessive temperature rise of the oxidation catalyst 4 can be prevented from occurring more effectively.

In this embodiment, in the case where the level of activity of the oxidation catalyst 4 falls within the over-active range at the time when the filter regeneration control is executed, the flow rate of the EGR gas flowing in the EGR passage 15 may be decreased by operating the EGR valve 16 in the closing direction.

As the flow rate of the EGR gas is decreased, the flow rate of the exhaust gas flowing into the oxidation catalyst 4 increases correspondingly. Therefore, the flow rate of the exhaust gas passing through the oxidation catalyst 4 can also be increased by this measure, whereby the quantity of heat carried away by the exhaust gas can be increased.

Embodiment 4

Figure 12:
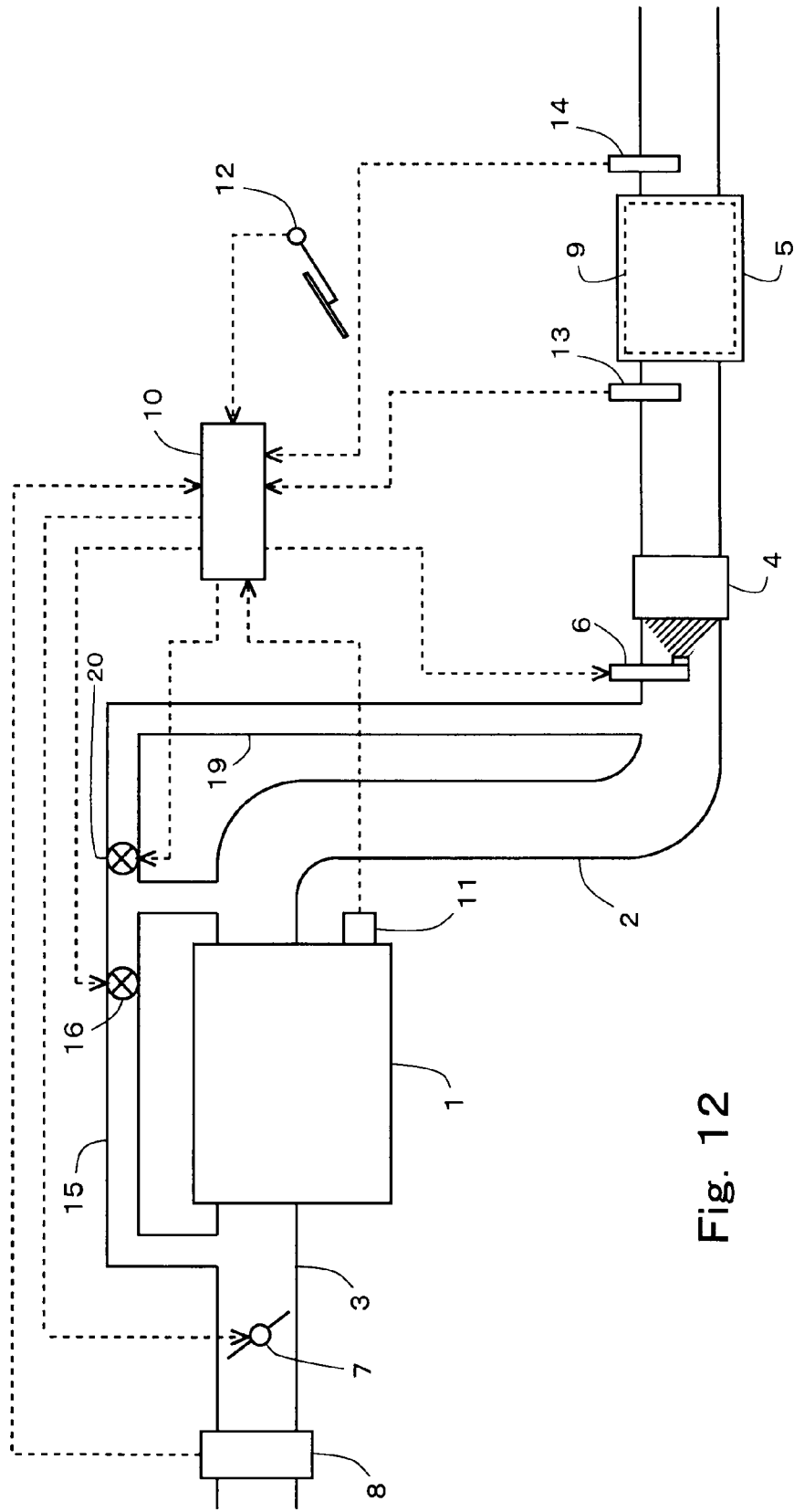
FIG. 12 is a diagram showing the general configuration of an air-intake and exhaust system of an internal combustion engine according to embodiment 4.

FIG. 12 is a diagram showing the general configuration of the air-intake and exhaust system of an internal combustion engine according to this embodiment. In this embodiment, there is provided an EGR gas introduction passage 19, one end of which is connected to the EGR passage 15, and the other end of which is connected to the exhaust passage 2 immediately upstream of the fuel addition valve 6. The EGR gas introduction passage 19 is provided with an introduction control valve 20 that closes or opens the EGR gas introduction passage 19. The introduction control valve 20 is electrically connected with the ECU 10 and controlled by it. Since the components other than described above are the same as those in embodiment 1, like components will be denoted by like reference numerals to omit descriptions thereof. In this embodiment, the EGR gas introduction passage 19 and the introduction control valve 20 correspond to the EGR gas introduction unit according to the present invention.

In this embodiment also, a filter regeneration control similar to that in embodiment 1 is executed. That is to say, the pattern of the addition of fuel through the fuel addition valve 6 in executing the filter regeneration control is changed in accordance with the level of activity of the oxidation catalyst 4. In this embodiment, in the case where the level of activity of the oxidation catalyst 4 falls within the over-active range at the time when the filter regeneration control is executed, the introduction control valve 20 is opened to make the EGR gas introduction passage 19 open.

As the EGR gas introduction passage 19 is made open, the EGR gas is introduced into the exhaust passage 2 immediately upstream of the fuel addition valve 6. Then, the EGR gas flows into the oxidation catalyst 4 together with the exhaust gas. Thereby the flow rate of the gas (i.e. the exhaust gas plus EGR gas) passing through the oxidation catalyst 4 increases, like in the case where the flow rate of the exhaust gas is increased. Consequently, the quantity of heat carried away by the gas increases. Therefore, in this embodiment also, an excessive temperature rise of the oxidation catalyst 4 can be prevented from occurring more effectively, as with embodiment 3.

Embodiment 5

Figure 13:
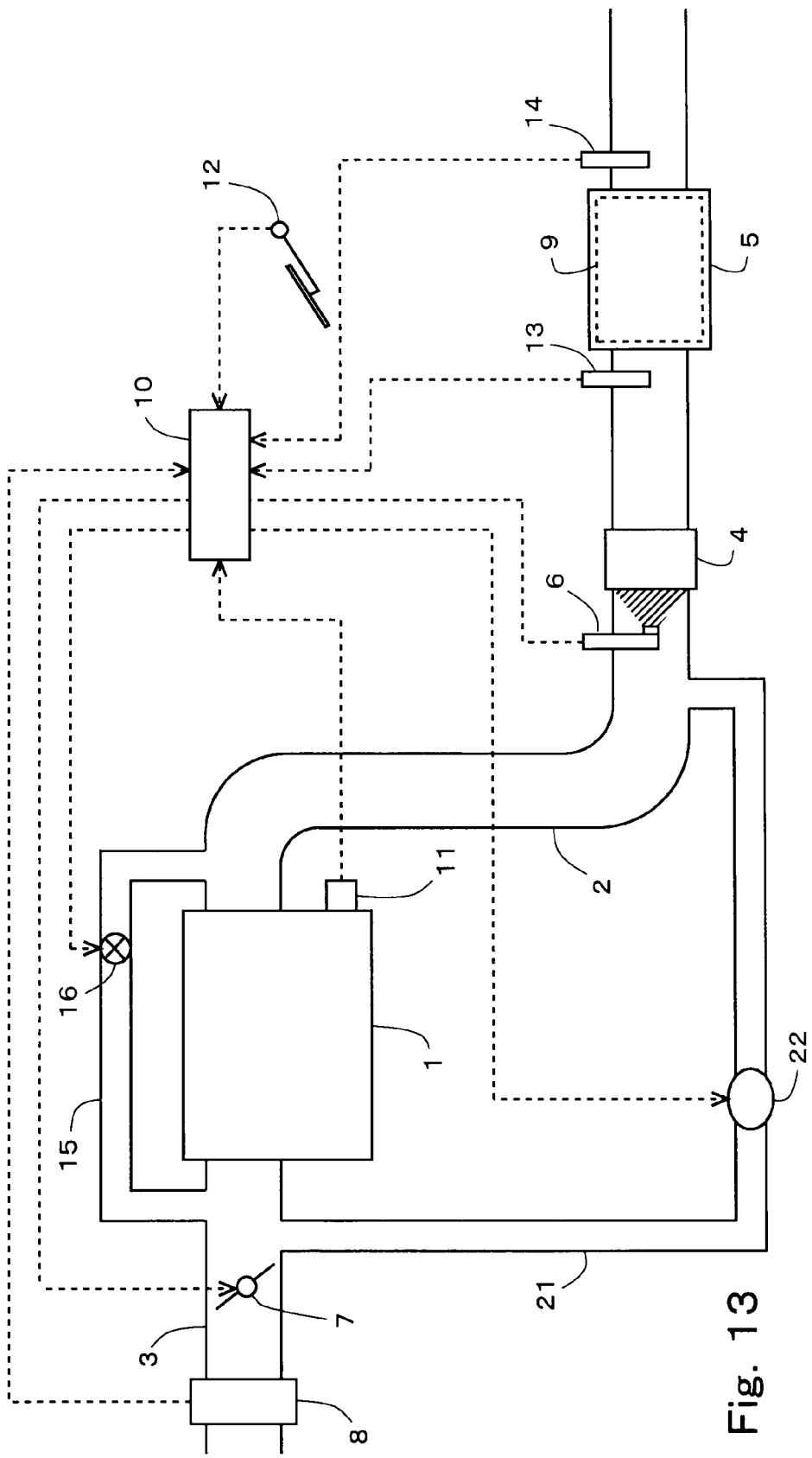
FIG. 13 is a diagram showing the general configuration of an air-intake and exhaust system of an internal combustion engine according to embodiment 5.

FIG. 13 is a diagram showing the general configuration of the air-intake and exhaust system of an internal combustion engine according to this embodiment. In this embodiment, there is provided an intake air introduction passage 21, one end of which is connected to the intake passage 3 downstream of the throttle valve 7, and the other end of which is connected to the exhaust passage 2 immediately upstream of the fuel addition valve 6. The intake air introduction passage 21 is provided with a pump 22 that pumps intake air from one end to the other end. Thus, as the pump 22 operates, a portion of the intake air flowing in the intake passage 3 is introduced to a place immediately upstream of the fuel addition valve 6 through the intake air introduction passage 21. The pump 22 is electrically connected with the ECU 10 and controlled by it. Since the components other than described above are the same as those in embodiment 1, like components will be denoted by like reference numerals to omit descriptions thereof. In this embodiment, the intake air introduction passage 21 and the pump 22 correspond to the fresh air introduction unit according to the present invention.

In this embodiment also, a filter regeneration control similar to that in embodiment 1 is executed. That is to say, the pattern of the addition of fuel through the fuel addition valve 6 in executing the filter regeneration control is changed in accordance with the level of activity of the oxidation catalyst 4. In this embodiment, in the case where the level of activity of the oxidation catalyst 4 falls within the over-active range at the time when the filter regeneration control is executed, the pump 22 is caused to operate.

As the pump 22 operates to introduce intake air flowing in the intake passage 3 to a place immediately upstream of the fuel addition valve 6, the flow rate of the gas (i.e. the exhaust gas plus intake air) passing through the oxidation catalyst 4 increases, like in the case where the flow rate of the exhaust gas is increased. Consequently, the quantity of heat carried away by the gas increases. Therefore, in this embodiment also, an excessive temperature rise of the oxidation catalyst 4 can be prevented from occurring more effectively, as with embodiment 3. The temperature of the intake air of the internal combustion engine is lower than the temperature of the exhaust gas. Therefore, according to this embodiment, an excessive temperature rise of the oxidation catalyst 4 can be prevented from occurring more effectively.

In this embodiment, in the case where the level of activity of the oxidation catalyst 4 falls within the over-active range at the time when the filter regeneration control is performed, outside air may be introduced into the oxidation catalyst 4 instead of intake air of the internal combustion engine 1. By this measure also, the flow rate of the gas (i.e. the exhaust gas plus outside gas) passing through the oxidation catalyst 4 can be increased. Therefore, an excessive temperature rise of the oxidation catalyst 4 can be prevented from occurring more effectively. As with the intake air of the internal combustion engine, the outside air has a temperature lower than the exhaust gas. Therefore, in the case where outside air is introduced into the oxidation catalyst 4, an excessive temperature rise of the oxidation catalyst 4 can be prevented more effectively.

Embodiment 6

Figure 14:
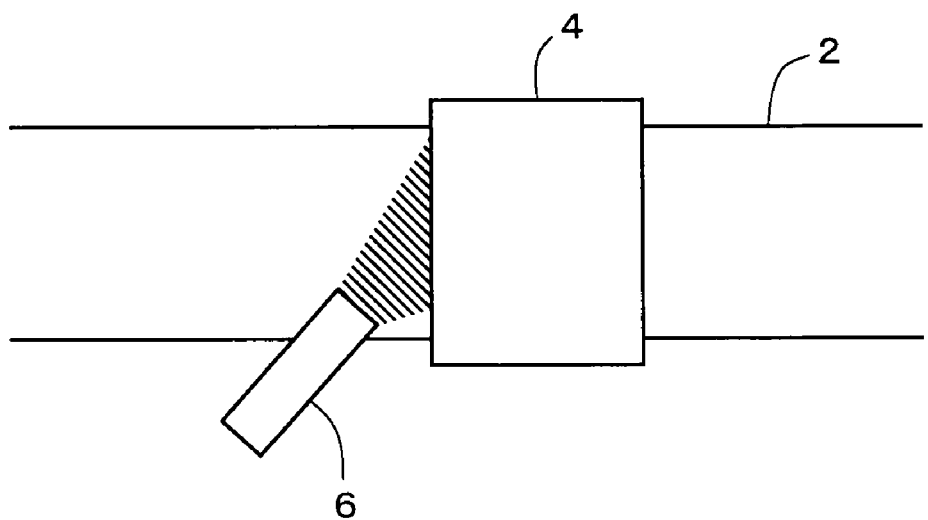
FIG. 14 is a diagram showing the arrangement of an oxidation catalyst and a fuel addition valve according to embodiment 6.

FIG. 14 shows the arrangement of the oxidation catalyst 4 and the fuel addition valve 6 in this embodiment. In this embodiment, as shown in FIG. 14, the fuel addition valve 6 is disposed in such a way that fuel is added to the upstream end surface of the oxidation catalyst 4 obliquely from below the oxidation catalyst 4. Since the components other than mentioned above are the same as those in embodiment 1, descriptions thereof will be omitted.

In this embodiment also, a filter regeneration control similar to that in embodiment 1 is executed. That is to say, during the execution of the filter regeneration control, fuel is added through the fuel addition valve 6 toward the upstream end surface of the oxidation catalyst 4. The fuel addition pattern in this process is changed in accordance with the level of activity of the oxidation catalyst 4.

Figure 15:
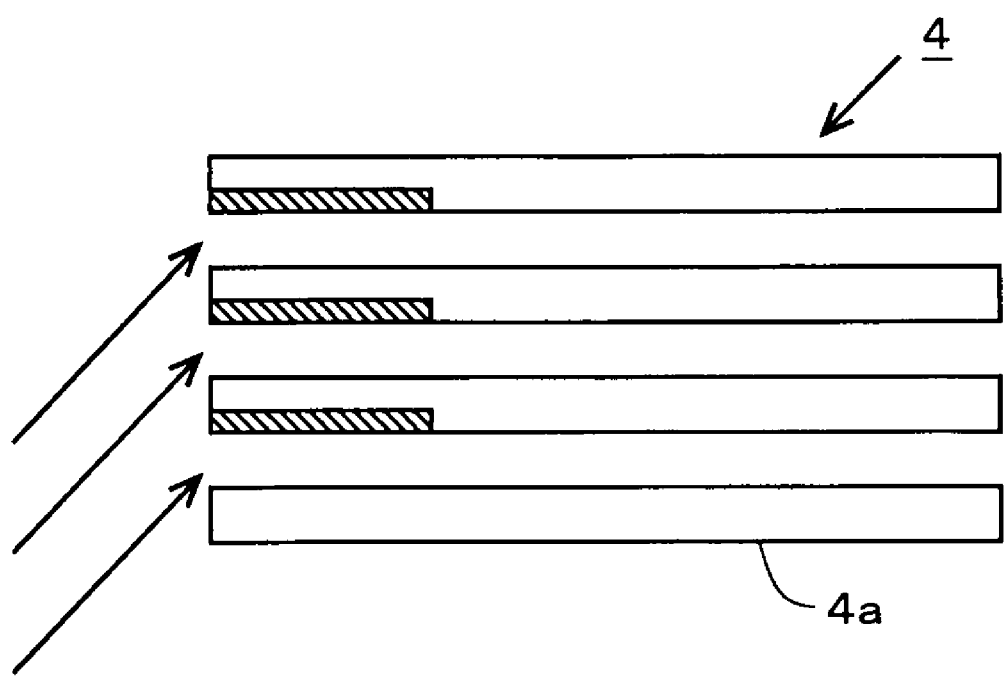
FIG. 15 is a diagram showing partition walls of the oxidation catalyst and the direction of the addition of fuel from the fuel addition valve according to embodiment 6.

FIG. 15 is a diagram showing partition walls 4a of the oxidation catalyst 4 and the direction of addition of fuel from the fuel injection valve 6 according to this embodiment. In FIG. 15, the arrows indicate the direction of addition of fuel from the fuel addition valve 6, and the hatched portions represent the portions of partition walls on which the fuel added through the fuel injection valve 6 strikes.

As described above, in this embodiment, fuel is added to the upstream end surface of the oxidation catalyst 4 obliquely from below the oxidation catalyst 4. In this case, fuel is more likely to strike on the lower surfaces of the partition walls 4a of the oxidation catalyst 4 than in the case where fuel is added from the direct front of the upstream end surface of the oxidation catalyst 4. Furthermore, the quantity of fuel that slips through the oxidation catalyst 4 without striking on the partition walls 4a of the oxidation catalyst 4 is decreased.

Consequently, when fuel is added through the fuel addition valve 6, cooling by the fuel is promoted more strongly in the portion on which fuel is more likely to strike. Specifically, the lower surfaces of the partition walls 4a of the oxidation catalyst 4 tend to be cooled by the fuel.

Therefore, in the case where fuel is added through the fuel addition valve 6 more intensively as is the case when the filter regeneration control is executed at a time when the level of activity of the oxidation catalyst 4 falls within the over-active range, cooling of the lower surfaces of the partition walls 4a of the oxidation catalyst 4 proceeds rapidly. Since the quantity of cooling is large, the temperature of the upper surfaces of the partition walls 4a of the oxidation catalyst 4 also decreases by virtue of thermal conduction. Thus, according to this embodiment, an excessive temperature rise of the oxidation catalyst 4 can be prevented more effectively in the case where the filter regeneration control is executed at a time when the level of activity of the oxidation catalyst 4 falls within the over-active range.

On the other hand, in this embodiment, fuel is more unlikely to strike on the upper surfaces of the partition walls 4a of the oxidation catalyst 4 than in the case where the fuel is added from the direct front of the upstream end surface of the oxidation catalyst 4. In addition, when the fuel added through the fuel addition valve 6 strikes on the lower surfaces of the partition walls 4a of the oxidation catalyst 4, the fuel is diffused, and the diffused fuel is oxidized on the upper surfaces of the partition walls 4a of the oxidation catalyst 4. Consequently, the oxidation of fuel tends to be promoted on the upper surfaces of the partition walls 4a of the oxidation catalyst 4.

Therefore, in the case where fuel is added through the fuel addition valve 6 so as to facilitate promotion of the oxidation of fuel in the oxidation catalyst 4 like in the case where the filter regeneration control is executed at a time when the level of activity of the oxidation catalyst 4 falls within the optimum activity range, the oxidation of fuel on the upper surfaces of the partition walls 4a of the oxidation catalyst 4 is promoted more effectively. In consequence, heating of the upper surfaces of the partition walls 4a of the oxidation catalyst 4 proceeds rapidly. Since the quantity of heating is large, the temperature of the lower surfaces of the partition walls 4a of the oxidation catalyst 4 also increases by virtue of thermal conduction. Therefore, according to this embodiment, the temperature of the oxidation catalyst 4 can be increased more rapidly in the case where the filter regeneration control is executed at a time when the level of activity of the oxidation catalyst 4 falls within the optimum activity range.

In the above-described embodiments 1 to 6, the intermittent addition of fuel through the fuel addition valve 6 is also performed in executing an NOx reduction control for releasing and reducing NOx stored in the NOx catalyst 9 supported on the filter 5 and an SOx poisoning recovery control for releasing and reducing SOx stored in the NOx catalyst 9 supported on the filter 5.

Therefore, the pattern of the addition of fuel through the fuel addition valve 6 in executing the NOx reduction control and the SOx poisoning recovery control may be changed in accordance with the level of activity of the oxidation catalyst 4, as is the case in executing the filter regeneration control. Thereby, an excessive temperature rise of the oxidation catalyst 4 can be prevented from occurring even in the case where the level of activity of the oxidation catalyst 4 falls within the over-active range at the time when the NOx reduction control or the SOx poisoning recovery control is executed.

Embodiment 7

The general configuration of the air-intake and exhaust system of the internal combustion engine according to this embodiment is the same as that in embodiment 1. In this embodiment also, the filter regeneration control is executed by adding fuel through the fuel addition valve 6, as with embodiment 1. In executing the filter regeneration control according to this embodiment also, a required addition quantity of fuel is added through the fuel addition valve 6 intermittently in multiple separate portions.

<Changes in Operation State During Execution of Filter Regeneration Control>

The operation state of the internal combustion engine 1 may change during the execution of the filter regeneration control in some cases. If the operation state of the internal combustion engine 1 changes into a transitional operation in which the engine load increases (i.e. accelerating operation) during the execution of the filter regeneration control, the temperature of the exhaust gas flowing into the oxidation catalyst 4 rises. In consequence the level of activity of the oxidation catalyst 4 becomes high, whereby the oxidation of fuel in the oxidation catalyst 4 may be promoted abruptly in some cases.

On the other hand, if the operation state of the internal combustion engine 1 changes into a transitional operation in which the engine load decreases (i.e. decelerating operation) during the execution of the filter regeneration control, the flow rate of the exhaust gas flowing into the oxidation catalyst 4 decreases. In consequence, the time taken for the fuel to pass through the oxidation catalyst 4 becomes longer, whereby the oxidation of fuel in the oxidation catalyst 4 may be promoted abruptly in some cases.

Therefore, when the operation state of the internal combustion engine 1 has changed in the above-described manner during the execution of the filter regeneration control, if the addition of fuel through the fuel addition valve 6 is performed with the fuel addition pattern same as that used before the change in the operation state, an excessive temperature rise of the oxidation catalyst 4 may occur.

In view of this, in the filter regeneration control according to this embodiment, when the operation state of the internal combustion engine 1 has changed in the above-described manner during the execution thereof, the fuel addition pattern used in adding fuel through the fuel addition valve 6 is changed so as to prevent an excessive temperature rise of the oxidation catalyst 4 from occurring.

<Fuel Addition Pattern Control>

Figure 16:
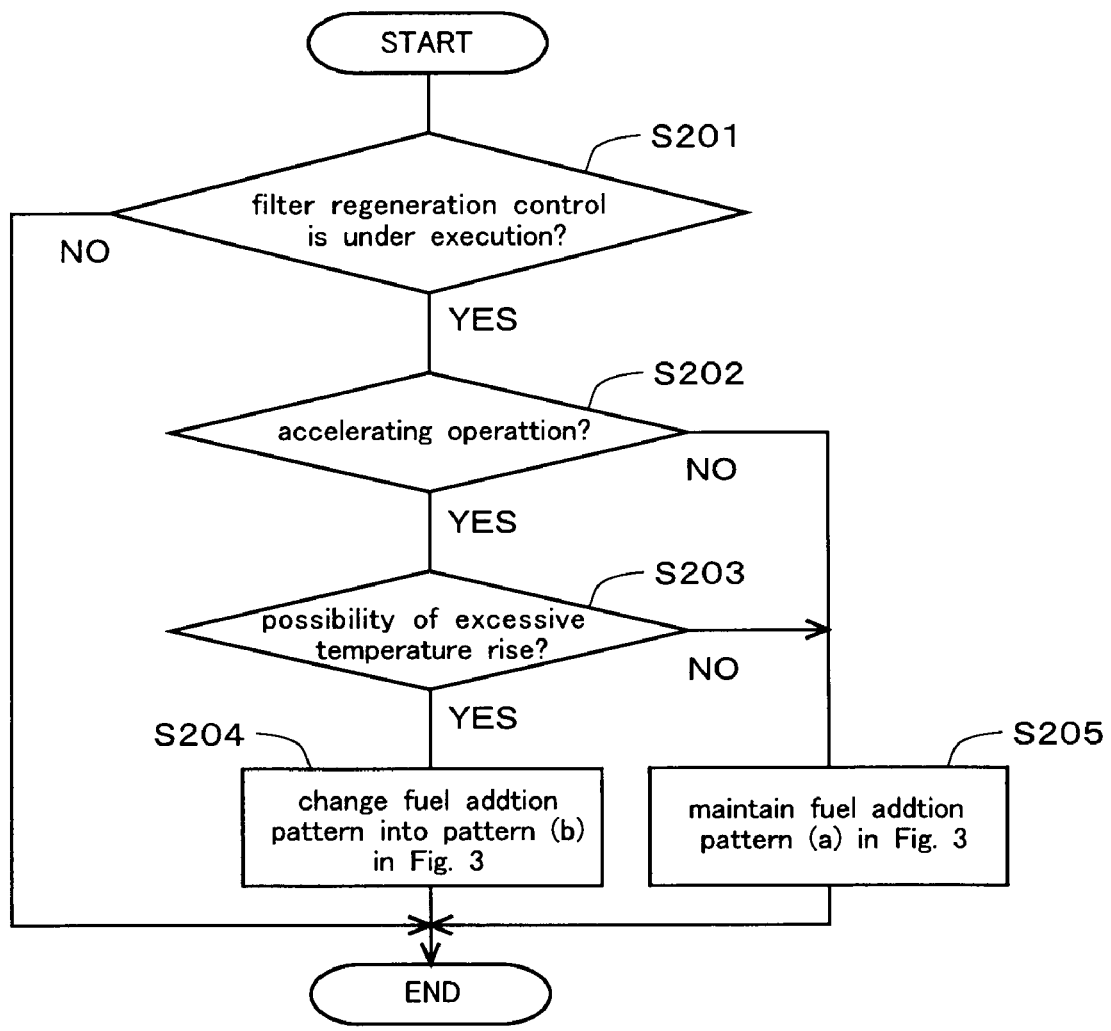
FIG. 16 is a first flow chart showing a routine of a control of the fuel addition pattern during the execution of the filter regeneration control according to embodiment 7.
Figure 17:
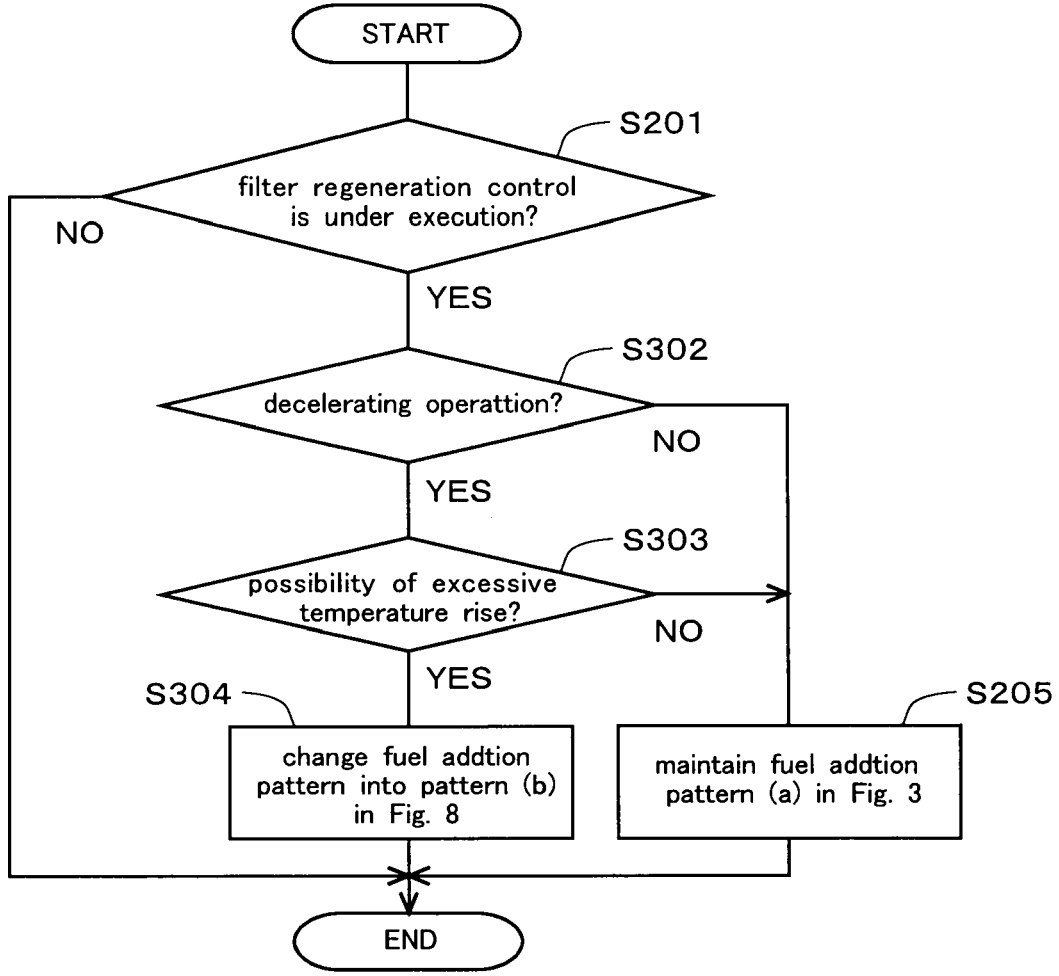
FIG. 17 is a second flow chart showing a routine of a control of the fuel addition pattern during the execution of the filter regeneration control according to embodiment 7.

In the following, a fuel addition pattern control during the execution of the filter regeneration control according to this embodiment will be described with reference to the flow charts shown in FIGS. 16 and 17. FIGS. 16 and 17 are flow charts showing the routines of controlling the fuel addition pattern during the execution of the filter regeneration control according to this embodiment. These routines are stored in the ECU 10 in advance and executed at predetermined intervals during the operation of the internal combustion engine 1.

FIG. 16 is a flow chart showing the routine of the fuel addition pattern control in the case where the operation state of the internal combustion engine 1 changes to an accelerating operation during the execution of the filter regeneration control.

In this routine, first in step S201, the ECU 10 determines whether or not the filter regeneration control is under execution. Here, it is assumed that if the filter regeneration control is under execution, the pattern of the addition of fuel through the fuel addition valve 6 is the fuel addition pattern shown in diagram (a) in FIG. 3. If the determination in step S201 is affirmative, the ECU 10 proceeds to step S202, and if the determination is negative, the ECU 10 once terminates execution of this routine.

In step S202, the ECU 10 determines whether or not the operation state of the internal combustion engine 1 has changed to an accelerating operation. If the determination in step S202 is affirmative, the ECU 10 proceeds to step S203, and if the determination is negative, the ECU 10 proceeds to step S205.

In step S203, the ECU 10 determines whether or not there is a possibility that an excessive temperature rise of the oxidation catalyst 4 occurs. Here, the determination as to whether or not there is a possibility that an excessive temperature rise of the oxidation catalyst 4 occurs can be made based on, for example, the amount of increase in the engine load of the internal combustion engine 1. If the determination in step S203 is affirmative, the ECU 10 proceeds to step S204, and if the determination is negative, the ECU 10 proceeds to step S205.

In step S204, the ECU 10 changes the pattern of addition of fuel through the fuel addition valve 6 into the fuel addition pattern shown in diagram (b) in FIG. 3. Thereafter, the ECU 10 once terminates execution of this routine.

In step S205, the ECU 10 maintains the fuel addition pattern shown in diagram (a) in FIG. 3 as the pattern of addition of fuel through the fuel addition valve 6. Thereafter, the ECU 10 once terminates execution of this routine.

According to the above-described routine, if the operation state of the internal combustion engine 1 changes to an accelerating operation while the filter regeneration control is executed using the fuel addition pattern shown in diagram (a) in FIG. 3 as the pattern of addition of fuel through the fuel addition valve 6, and there arises a possibility that an excessive temperature rise of the oxidation catalyst 4 occurs, the pattern of addition of fuel through the fuel addition valve 6 is changed into the fuel addition pattern shown in diagram (b) in FIG. 3. Thereby, fuel is supplied to the oxidation catalyst 4 more intensively, and an excessive temperature rise of the oxidation catalyst 4 can be prevented from occurring.

During the accelerating operation, the oxidation of fuel in the oxidation catalyst 4 is promoted abruptly by a large increase in the temperature of the exhaust gas flowing into the oxidation catalyst 4, as described above. Therefore, it is more effective, in preventing an excessive temperature rise of the oxidation catalyst 4, to decrease the oxygen concentration in the ambient atmosphere around the oxidation catalyst 4 by shortening the fuel addition suspension period $\Delta ts$ like in the fuel addition pattern shown in diagram (b) in FIG. 3 than to increase the quantity of fuel added per unit time during each fuel addition period $\Delta ta$ like in the fuel addition pattern shown in diagram (b) in FIG. 8.

FIG. 17 is a flow chart showing the routine of the fuel addition pattern control in the case where the operation state of the internal combustion engine 1 changes to a decelerating operation during the execution of the filter regeneration control. In this routine, steps S202 to S204 in the routine shown in FIG. 16 have been replaced by steps S302 to S304. Therefore, only these steps will be described and descriptions of steps S201 and S205 will be omitted.

In this routine, if the determination in step S201 is affirmative, the ECU 10 proceeds to step S302. In step S302, the ECU 10 determines whether or not the operation state of the internal combustion engine 1 has changed to a decelerating operation. If the determination in step S302 is affirmative, the ECU 10 proceeds to step S303, and if the determination is negative, the ECU 10 proceeds to step S205.

In step S303, the ECU 10 determines whether or not there is a possibility that an excessive temperature rise of the oxidation catalyst 4 occurs. Here, the determination as to whether or not there is a possibility that an excessive temperature rise of the oxidation catalyst 4 occurs can be made based on, for example, the amount of decrease in the engine load of the internal combustion engine 1. If the determination in step S303 is affirmative, the ECU 10 proceeds to step S304, and if the determination is negative, the ECU 10 proceeds to step S205.

In step S304, the ECU 10 changes the pattern of addition of fuel through the fuel addition valve 6 into the fuel addition pattern shown in diagram (b) in FIG. 8. Thereafter, the ECU 10 once terminates execution of this routine.

According to the above-described routine, if the operation state of the internal combustion engine 1 changes to a decelerating operation while the filter regeneration control is executed using the fuel addition pattern shown in diagram (a) in FIG. 3 as the pattern of addition of fuel through the fuel addition valve 6, and there arises a possibility that an excessive temperature rise of the oxidation catalyst 4 occurs, the pattern of addition of fuel through the fuel addition valve 6 is changed into the fuel addition pattern shown in diagram (b) in FIG. 8. Thereby, fuel is supplied to the oxidation catalyst 4 more intensively, and an excessive temperature rise of the oxidation catalyst 4 can be prevented from occurring.

During the decelerating operation, the oxidation of fuel in the oxidation catalyst 4 is promoted abruptly by a large decrease in the flow rate of the exhaust gas flowing into the oxidation catalyst 4, as described above. Therefore, it is more effective, in preventing an excessive temperature rise of the oxidation catalyst 4, to increase the quantity of fuel added per unit time during each fuel addition period $\Delta ta$ like in the fuel addition pattern shown in diagram (b) in FIG. 8 than to shorten the fuel addition suspension period $\Delta ts$ like in the fuel addition pattern shown in diagram (b) in FIG. 3.

The general configuration of the air-intake and exhaust system of the internal combustion engine according to this embodiment is not limited to one the same as that in embodiment 1. The fuel addition pattern control during the execution of the filter regeneration control according to this embodiment may be applied also to the configurations according to embodiments 2 to 6.

Embodiment 8

The general configuration of the air-intake and exhaust system of the internal combustion engine according to this embodiment is the same as that in embodiment 1. In this embodiment also, the filter regeneration control is executed by adding fuel through the fuel addition valve 6, as with embodiment 1. In executing the filter regeneration control according to this embodiment also, a required addition quantity of fuel is added through the fuel addition valve 6 intermittently in multiple separate portions.

<Changes in Operation State During Execution of Filter Regeneration Control>

If the operation state of the internal combustion engine 1 shifts into a low load, high speed region, during the execution of the filter regeneration control, the temperature of the exhaust gas decreases, and the flow rate of the exhaust gas increases, whereby the required fuel addition quantity increases greatly. In this case, if the required addition quantity of fuel is added through the fuel addition valve 6 with the fuel addition period and the fuel addition suspension period same as those in the fuel addition pattern used before the change in the operation state, an excessive temperature rise of the oxidation catalyst 4 may occur.

In view of this, in the filter regeneration control according to this embodiment, when the operation state of the internal combustion engine 1 changes in the above described manner during the execution thereof, the pattern of addition of fuel through the fuel addition valve 6 is changed so as to prevent an excessive temperature rise of the oxidation catalyst 4 from occurring.

<Fuel Addition Pattern Control>

Figure 18:
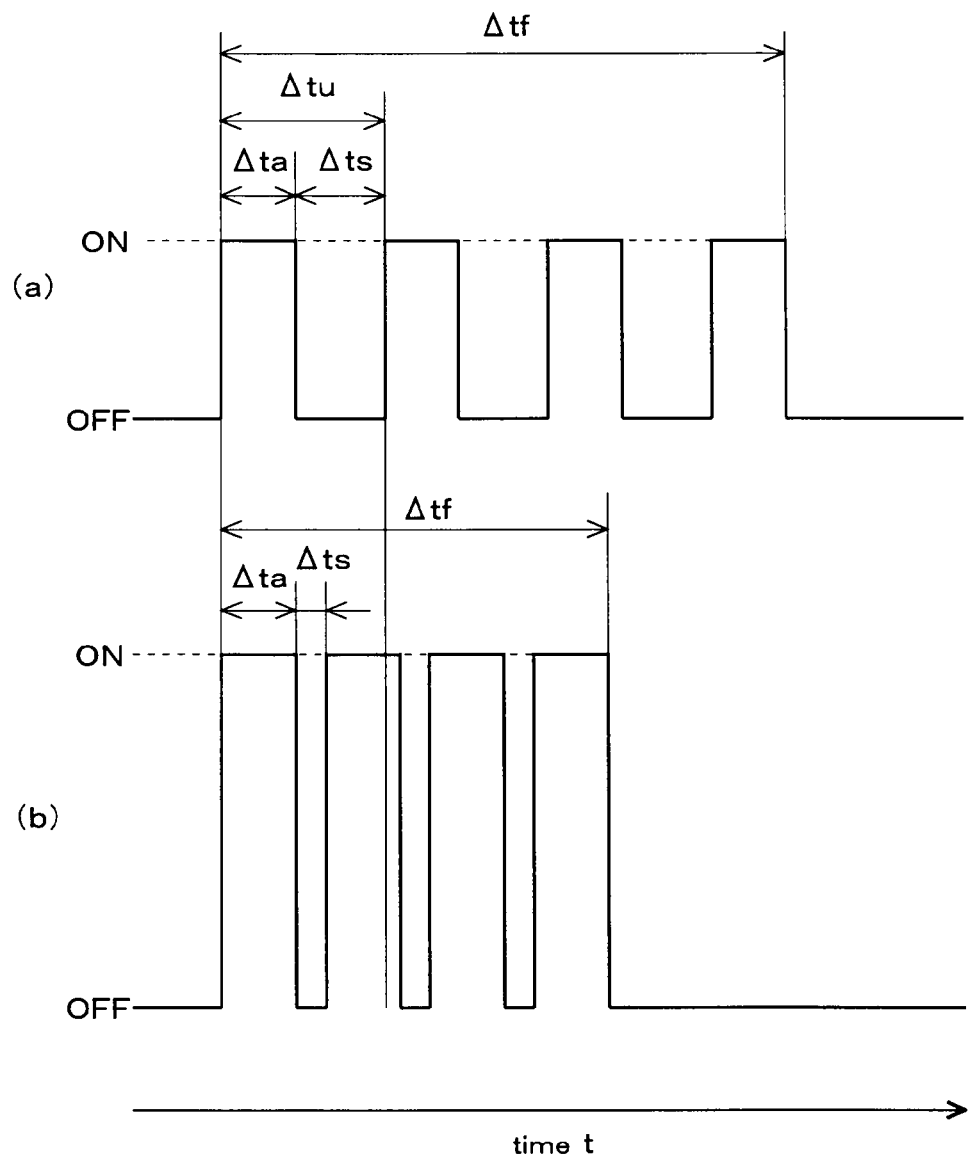
FIG. 18 shows fuel addition patterns used in executing a filter regeneration control according to embodiment 8. Diagram (a) in FIG. 18 shows a fuel addition pattern used in the case where the filter regeneration control is executed at a time when the level of activity of the oxidation catalyst falls within an optimum activity range. Diagram (b) in FIG. 18 shows a fuel addition pattern used in the case where the operation state of the internal combustion engine shifts into a region in which the engine load is equal to or lower than a specific load and the engine speed is equal to or higher than a specific speed during the execution of the filter regeneration control.

FIG. 18 shows fuel addition patterns in executing the filter regeneration control according to this embodiment. Diagram (a) in FIG. 18 shows a fuel addition pattern used in the case where the filter regeneration control is executed at a time when the level of activity of the oxidation catalyst 4 falls within the optimum activity range. The fuel addition pattern shown in diagram (a) in FIG. 18 is the same as the fuel addition pattern shown in diagram (a) in FIG. 3.

Diagram (b) in FIG. 18 shows a fuel addition pattern used in the case where the operation state of the internal combustion engine 1 has shifted, during the execution of the filter regeneration control, into a region in which the engine load Qe is equal to or lower than a specific load Qe0 and the engine speed Ne is equal to or higher than a specific speed Ne0. Here, the specific load Qe0 and the specific rotational speed Ne0 are set as threshold values beyond which it may be concluded that an excessive temperature rise of the oxidation catalyst 4 will occur if the required addition quantity of fuel is added through the fuel addition valve 6 with the fuel addition period and the fuel addition suspension period being maintained the same as those in the fuel addition pattern shown in diagram (a) in FIG. 18. The specific load Qe0 and the specific speed Ne0 can be determined in advance based on, for example, experiments.

In the fuel addition pattern shown in diagram (b) in FIG. 18, the fuel addition suspension period $\Delta ts$ is shorter than the standard addition suspension period, as is the case with the fuel addition pattern shown in diagram (b) in FIG. 3. In addition, the quantity of fuel added per unit time during each fuel addition period $\Delta ta$ is increased. (In FIG. 18, the height of the command signal in the periods in which it is ON represents the quantity of fuel added per unit time.) Thereby, the total amount of fuel added through the fuel addition valve 6 during the entire addition period $\Delta tf$ is controlled to be equal to the required addition quantity.

With the above-described fuel addition pattern, fuel can be added more intensively than in the case where the addition of fuel is performed with the fuel addition period and the fuel addition suspension period same as those in the fuel addition pattern shown in diagram (a) in FIG. 18. Thus, it is possible to add the required addition quantity of fuel while promoting cooling of the oxidation catalyst 4. Therefore, an excessive temperature rise of the oxidation catalyst 4 can be prevented.

Figure 19:
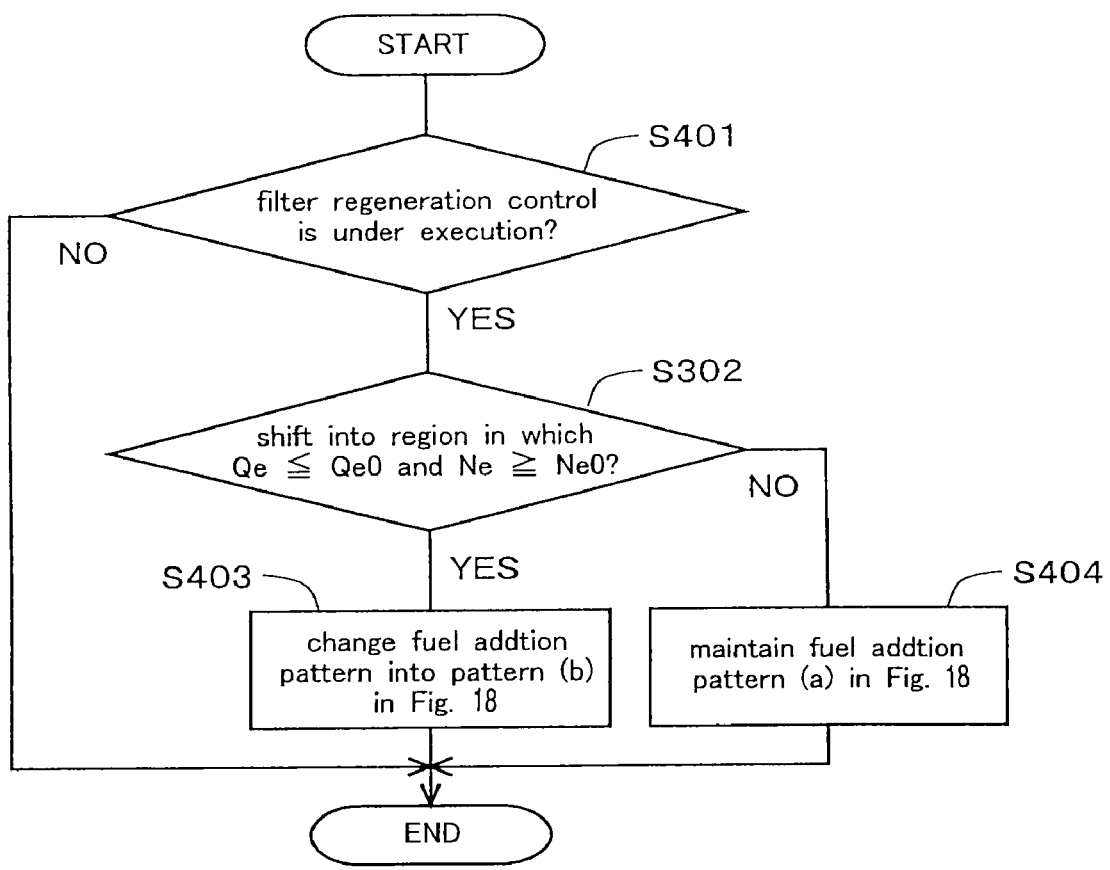
FIG. 19 is a flow chart showing a routine of a control of the fuel addition pattern during the execution of the filter regeneration control according to embodiment 8.

In the following, a fuel addition pattern control during the execution of the filter regeneration control according to this embodiment will be described with reference to the flow chart shown in FIG. 19. FIG. 19 is a flow chart showing the routine of the fuel addition pattern control during the execution of the filter regeneration control. This routine is stored in the ECU 10 in advance and executed at predetermined intervals during the operation of the internal combustion engine 1.

In this routine, first in step S401, the ECU 10 determines whether or not the filter regeneration control is under execution. Here, it is assumed that if the filter regeneration control is under execution, the pattern of the addition of fuel through the fuel addition valve 6 is the fuel addition pattern shown in diagram (a) in FIG. 18. If the determination in step S401 is affirmative, the ECU 10 proceeds to step S402, and if the determination is negative, the ECU 10 once terminates execution of this routine.

In step S402, the ECU 10 determines whether or not the operation state of the internal combustion engine 1 has shifted into the region in which the engine load Qe is equal to or lower than the specific load Qe0 and the engine rotational speed Ne is equal to or higher than the specific speed Ne0. If the determination in step S402 is affirmative, the ECU 10 proceeds to step S403, and if the determination is negative, the ECU 10 proceeds to step S404.

In step S403, the ECU 10 changes the pattern of addition of fuel through the fuel addition valve 6 into the fuel addition pattern shown in diagram (b) in FIG. 18. Thereafter, the ECU 10 once terminates execution of this routine.

In step S404, the ECU 10 changes the pattern of addition of fuel through the fuel addition valve 6 into the fuel addition pattern shown in diagram (a) in FIG. 18. Thereafter, the ECU 10 once terminates execution of this routine.

The general configuration of the air-intake and exhaust system of the internal combustion engine according to this embodiment is not limited to one the same as that in embodiment 1. The fuel addition pattern control during the execution of the filter regeneration control according to this embodiment may be applied also to the configurations according to embodiments 2 to 6.

The embodiments described in the foregoing may be applied in combinations as long as possible.

INDUSTRIAL APPLICABILITY

According to the present invention, an excessive temperature rise of a precatalyst can be prevented from occurring even in the case where a reducing agent is added toward the upstream end surface of a precatalyst having a heat capacity smaller than that of an exhaust gas purification apparatus.

The invention claimed is:

1. An exhaust gas purification system for an internal combustion engine comprising:

an exhaust gas purification apparatus provided in an exhaust passage of an internal combustion engine and configured to include a catalyst;

a precatalyst provided in the exhaust passage upstream of said exhaust gas purification apparatus, having a heat capacity smaller than that of said exhaust gas purification apparatus, and having an oxidizing ability;

a reducing agent addition valve provided in the exhaust passage immediately upstream of said precatalyst to add a reducing agent in a liquid state toward an upstream end surface of said precatalyst, and a controller configured to execute a routine in which when a function of said exhaust gas purification apparatus is to be recovered, the controller determines a required addition quantity or a quantity of added reducing agent needed to recover said function, and the controller controls said reducing agent addition valve to add the required addition quantity of reducing agent intermittently in multiple separate portions, and where a level of activity of said precatalyst is higher than a specific level at the time when the intermittent addition of the reducing agent through said reducing agent addition valve is performed, and during at least a portion of a period over which the intermittent addition of the reducing agent is performed, to cool said precatalyst, the controller controls said reducing agent addition valve to add a quantity of reducing agent larger than a quantity of reducing agent added in one reducing agent addition period where the level of activity of said precatalyst is equal to or lower than said specific level in a time period equal to a sum of one reducing agent addition period and one reducing agent addition suspension period subsequent thereto where the level of activity of said precatalyst is equal to or lower than said specific level.

2. An exhaust gas purification system for an internal combustion engine according to claim 1, wherein where the level of activity of said precatalyst is higher than said specific level at the time when the intermittent addition of the reducing agent through said reducing agent addition valve is performed, the routine includes at least one of the controller making the reducing agent addition suspension period shorter than that where the level of activity of said precatalyst is equal to or lower than said specific level, the controller making the reducing agent addition period longer than that where the level of activity of said precatalyst is equal to or lower than said specific level, and the controller making a quantity of reducing agent added per unit time during the reducing agent addition period larger than that where the level of activity of said precatalyst is equal to or lower than said specific level, which is executed during at least a portion of a period over which the intermittent addition of the reducing agent is performed.

3. An exhaust gas purification system for an internal combustion engine according to claim 1, wherein said precatalyst is provided in such a way that not all but a portion of the exhaust gas flowing into said exhaust gas purification apparatus passes through said precatalyst.

4. An exhaust gas purification system for an internal combustion engine according to claim 1, wherein where the level of activity of said precatalyst is higher than said specific level at the time when the addition of the reducing agent through said reducing agent addition valve is performed, the routine includes the controller increasing the flow rate of the exhaust gas flowing into said precatalyst.

5. An exhaust gas purification system for an internal combustion engine according to claim 1, further comprising:

an EGR apparatus that introduces a portion of the exhaust gas into an intake system of said internal combustion engine as EGR gas; and an EGR gas introduction unit that introduces the EGR gas into said precatalyst where the level of activity of said precatalyst is higher than said specific level at the time when the addition of the reducing agent through said reducing agent addition valve is performed.

6. An exhaust gas purification system for an internal combustion engine according to claim 1, further comprising a fresh air introduction unit that introduces intake air of said internal combustion engine or outside air into said precatalyst where the level of activity of said precatalyst is higher than said specific level at the time when the addition of the reducing agent through said reducing agent addition valve is performed.

7. An exhaust gas purification system for an internal combustion engine according to claim 1, wherein the routine includes the controller controlling said reducing agent addition valve to add the reducing agent obliquely to the upstream end surface of said precatalyst.

8. An exhaust gas purification system for an internal combustion engine according to claim 1, wherein the routine includes the controller determining a level of deterioration of said precatalyst based on the temperature of said precatalyst.

* * * * *